(12) United States Patent
Qiao et al.

(10) Patent No.: US 11,330,504 B2
(45) Date of Patent: *May 10, 2022

(54) RESTRICTED LOCAL OPERATOR SERVICES FOR A WIRELESS NETWORK

(71) Applicant: Ofinno, LLC, Reston, VA (US)

(72) Inventors: Weihua Qiao, Herndon, VA (US); Esmael Dinan, McLean, VA (US); Kyungmin Park, Herndon, VA (US); Peyman Talebi Fard, Sterling, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/095,091

(22) Filed: Nov. 11, 2020

(65) Prior Publication Data

US 2021/0068037 A1    Mar. 4, 2021

Related U.S. Application Data

(63) Continuation of application No. 16/378,995, filed on Apr. 9, 2019, now Pat. No. 10,841,864.

(Continued)

(51) Int. Cl.
*H04W 4/90* (2018.01)
*H04W 8/08* (2009.01)
(Continued)

(52) U.S. Cl.
CPC ........... *H04W 48/08* (2013.01); *H04M 15/66* (2013.01); *H04W 4/90* (2018.02); *H04W 8/08* (2013.01);
(Continued)

(58) Field of Classification Search
CPC ....... H04W 48/08; H04W 4/90; H04W 76/11; H04W 8/08; H04W 60/00; H04M 15/66
(Continued)

(56) References Cited

U.S. PATENT DOCUMENTS

| 2019/0053049 A1 | 2/2019 | Kunz et al. |
| 2019/0053139 A1 | 2/2019 | Basu Mallick |
| 2019/0053328 A1 | 2/2019 | Kunz et al. |

OTHER PUBLICATIONS

3GPP TR 22.820 V15.0.0 (Jul. 2017); Technical Report; 3rd Generation Partnership Project; Technical Specification Group Services and System Aspects; Study on Provision of Access to Restricted Local Operator Services by Unauthentica.

(Continued)

*Primary Examiner* — Gbemileke J Onamuti
(74) *Attorney, Agent, or Firm* — Sachin Kandhari; Kavon Nasabzadeh; Jacob L. Mangan

(57) ABSTRACT

A wireless device receives, from a base station, a system information block (SIB) indicating that restricted local operator services (RLOS) are supported by a public land mobile network. A preamble transmitting based on the SIB indicating the support for the RLOS. A random access response to the preamble is received. First radio resource control (RRC) message(s) are transmitted, based on the random access response comprising: a first information element indicating, to the base station, that an RRC connection of the wireless device is for the RLOS; and a second information element comprising an attach request message indicating, to a mobility management entity (MME) configured with an RLOS access point name, that the attach request of the wireless device is for the RLOS. A second RRC message comprising an attach accept message indicating acceptance of the RLOS by the MME is received from the base station.

20 Claims, 14 Drawing Sheets

Related U.S. Application Data

(60) Provisional application No. 62/654,814, filed on Apr. 9, 2018.

(51) Int. Cl.
  *H04W 76/11* (2018.01)
  *H04M 15/00* (2006.01)
  *H04W 48/08* (2009.01)
  *H04W 76/27* (2018.01)
  *H04W 60/00* (2009.01)

(52) U.S. Cl.
  CPC ............ *H04W 60/00* (2013.01); *H04W 76/11* (2018.02); *H04W 76/27* (2018.02)

(58) Field of Classification Search
  USPC .......................................................... 370/329
  See application file for complete search history.

(56) References Cited

OTHER PUBLICATIONS

3GPP TR 23.715 V0.3.0 (Mar. 2018); Technical Report; 3rd Generation Partnership Project; Technical Specification Group Services and System Aspects; Study on System enhancements for Provision of Access to Restricted Local Operator S.
S1-180522 CR for PARLOS 22011; 3GPPTSG-SA WG1 Meeting #81 S1-180522 Fukuoka, Japan, Feb. 5-9, 2018(revision of S1-180474); CR-Form-v11.2; Change Request.
S1-180601 CR for PARLOS 22101; 3GPPTSG-SA WG1 Meeting #81 S1-180601 Fukuoka, Japan, Feb. 5-9, 2018(revision of S1-180523, S1-180475); CR-Form-v11.2; Change Request.
S2-180083; SA WG2 Meeting #S2-125S2-180083; Jan. 22-26, 2018, Gothenburg, Sweden(revision of S2-18XXXX); ; SourcezEricsson ; Title:Update to Architectural Assumptions; Document forzDiscussion/Approval.
S2-180086; SA WG2 Meeting #S2-125S2-180086; Jan. 22-26, 2018, Gothenburg, Sweden(revision of S2-18XXXX);; Source:Ericsson ; Title:Removal of Key issue EPC#5 ; Document forzDiscussion/Approval.
S2-180087; Sa WG2 Meeting #S2-125S2-180087; Jan. 22-26, 2018, Gothenburg, Sweden(revision of S2-18XXXX); ; Source:Ericsson ; Title:Solution to Key issue #EPC-1; Document forzDiscussion/Approval.
S2-180088; SA WG2 Meeting #S2-125S2-180088 Jan. 22-26, 2018, Gothenburg, Sweden(revision of S2-18XXXX);; Source:Ericsson ; Title:Solution to Key issue #EPC-3 and #EPC-4; Document for:Discussion/Approval.
S2-180089; SA WG2 Meeting #S2-125S2-180089 Jan. 22-26, 2018, Gothenburg, Sweden(revision of S2-18XXXX);; Source:Ericsson ; Title:Solution to Key issue IMS-1, IMS-2, and IMS-3; Document for:Discussion/Approval.
S2-180389_PaRLOS-solution-r2; Sa WG2 Meeting #12532-180389 Jan. 22-26, 2018, Gothenburg, Sweden(was S2-18xxxx);; Source: Qualcomm Incorporated; Title:Solution for Restricted IMS Local Operator Services; Document for:Discussion/Approval.
S2-180463_pCR23715 RLOS sol EPC procedures_v2; SA WG2 Meeting #125S2-180463 Jan. 22-26, 2018, Gothenburg, Sweden(revision of S2-18xxxx);; Source:Nokia, Nokia Shanghai Bell, Verizon Title:23.715: Solution: EPC procedures for RLOS; Document for:Approval.
S2-180464_pCR23715 RLOS sol IMS procedures_v2; SA WG2 Meeting #125S2-180464 Jan. 22-26, 2018, Gothenburg, Sweden(revision of S2-18xxxx); Source:Nokia, Nokia Shanghai Bell, Verizon Title:23.715: Solution: IMS procedures for RLOS; Document for:Approval.
S2-180759_Parlos_Solution_KI_EPC-1+2_v02; SA WG2 Meeting #125S2-180759 Jan. 22-26, 2018, Gothenburg, Sweden(revision of S2-17xxxx); Source:Motorola Mobility, Lenovo; Title:Solution tor initial RLOS access; Document for:Approval.

S2-181001 was0461_pCR23715 RLOS assumptions update_v1; SA WG2 Meeting #125S2-181001 Jan. 22-26, 2018, Gothenburg, Sweden(revision of S2-180461);; Source:Nokia, Nokia Shanghai Bell, Verizon; Title:Update of RLOS architectural assumptions; Document for:Approval.
S2-181002; SA WG2 Meeting #S2-125S2-181002; Jan. 22-26, Gothenburg, Sweden(revision of S2-18XX84) Source:Ericsson ; Title:Update to Key issue IMS#1; Document for:Discussion/Approval.
S2-181003; SA WG2 Meeting #S2-125S2-181003; Jan. 22-26, Gothenburg, Sweden(revision of S2-18XX85); Source:Ericsson ; Title:Update to Key issue EPC#3; Document for:Discussion/Approval.
S2-181044 was1004 was0462_pCR23715 RLOS key issues update_v1; Sa WG2 Meeting #12532-181044 Jan. 22-26, 2018, Gothenburg, Sweden(revision of S2-181044); Source:Nokia, Nokia Shanghai Bell, Verizon fitle:Update of RLOS key issues; Document for:Approval.
S2-181407_e-mail_rev5_S2-181045; Sa WG2 Meeting #125S2-181407; Jan. 22-26, 2018, Gothenburg, Sweden(e-mail revision 5 of S2-181045); Title:Reply LS on clarification on Restricted Operator Services; Reply to:Reply LS on clarification on Restricted Operator Services (S2-180043/S1-174604); Release.
S2-181450 S3-180347; SA WG2 Meeting #S2-126S2-181450; Feb. 26, 2002-Mar. 2018, Montreal, Canada 3GPP TSG-SA WG3 Meeting #90 Tdoc S3-180347; Gothenburg (Sweden) Jan. 22-26, 2018.
S2-181707; SA WG2 Meeting #S2-126S2-181707; Feb. 26-Mar. 2, Montreal, Canada(revision of S2-18XXXX) Source:Ericsson ; Title:Solution to Key issue #EPC-1; Document for:Discussion/Approval.
S2-181708; SA WG2 Meeting #S2-126S2-181708; Feb. 26-Mar.2 Montreal, Canada(revision of S2-18XXXX) Source:Ericsson ; Title:Solution to Key issue #EPC-3 and #EPC-4; Document for:Discussion/Approval.
S2-181709; SA WG2 Meeting #S2-126S2-181709; Feb. 26-Mar. 2, Montreal, Canada(revision of S2-18XXXX) Source:Ericsson ; Title:Solution to Key issue IMS-1, IMS-2, and IMS-3; Document for:Discussion/Approval.
S2-181729_pCR23715 RLOS sol IMS procedures_v1; SA WG2 Meeting #12632-181729 Feb. 26-Mar. 2, 2018, Montreal, Canada(revision of S2-18xxxx);; Source:Nokia, Nokia Shanghai Bell, Verizon; Title:23.715: Solution: IMS procedures for RLOS; Document for:Approval.
S2-181799-PARLOS_solution-key-issue6-EPC_charginginfo_collect; 3GPP SA WG2 Meeting SA2#126S2-181799 Feb. 26-Mar. 2, Montreal, Canada(revision of S2-18XXXX);; Source:Ericsson ; Title:Solution to Key issue #EPC-6 Collection of charging information; Document for:Discussion/Approval.
S2-182115jparios_solution_ki_epc#4; SA WG2 Meeting #126S2-182115 Feb. 26-Mar. 2, 2018, Montreal, Canada;; Source:Samsung; Title:Solution for EPC#4 Support of authenticated UEs; Document for:Approval.
S2-182136_S1-180602; SA WG2 Meeting #S2-126S2-182136; Feb. 26-Mar. 2, 2018, Montreal, Canada; 3GPPTSG-SA WG1 Meeting#81 S1-180602; Fukuoka, Japan, Feb. 5-9, 2018(revision of S1-180524, S1-180473, S1-180279).
S2-182192; SA WG2 Meeting #12532-182192; Jan. 22-26, 2018, Gothenburg, Sweden(revision of S2-17xxxx) Source:NEC Corporation; Title:Solution for RLOS attach procedure.; Document for:Approval.
S2-182274_Parlos_Solution_KI_EPC-1+2_v02; Sa WG2 Meeting #12532-182274; L26 Feb-Mar. 2, 2018, Montreal, Canada(revision of S2-17xxxx); Source:Motorola Mobility, Lenovo; Title:Solution for initial RLOS access; Document for:Approval.
S2-182508 was1726_pCR23715 RLOS architectural assumptions update_v1; SA WG2 Meeting #12682-182508 Feb. 26-Mar. 2, 2018, Montreal, Canada(revision of S2-181726); Source:Nokia, Nokia Shanghai Bell; Title Update of RLOS architectural assumptions; Document for:Approval.
S2-182510_PaRLOS-solution-r7; Sa WG2 Meeting #12632-182510; Feb. 26-Mar. 2018, Montreal, Canada(was S2-180389); Source:Qualcomm Incorporated; Title:Solution for Restricted IMS Local Operator Services; Document for Discussion/Approval.

(56) References Cited

OTHER PUBLICATIONS

S2-182511 was1728_pCR23715 RLOS sol EPC procedures_v2; Sa WG2 Meeting #126S2-182511 Feb. 26-Mar. 2, 2018, Montreal, Canada(revision of S2-181728); Source:Nokia, Nokia Shanghai Bell, Verizon Title:23.715: Solution: EPC procedures for RLOS; Document for:Approval.
S2-182888 was2509 was1727_pCR23715 RLOS key issues update_v0.2; SA WG2 Meeting #126S2-182888 Feb. 26-Mar. 2, 2018, Montreal, Canada(revision of S2-182509); Source:Nokia, Nokia Shanghai Bell; Title Update of RLOS key issues; Document for:Approval.
SP-180116 S2-182753 Revised SID Parlos cl; 3GPPTSG SA Meeting #79TDSP-170116 Mar. 21-23, 2018, Chennai, India(Update of SP-170382); SA WG2 Meeting #126 S2-182753; Feb. 26-Mar. 2, 2018, Montreal, Canada; Source:SA WG2; Title:Revised SID: Study on System enhancements for Provision of Access to Restricted.
SP-180116 SP-170382 Revised SID Parlos rm; 3GPPTSG SA Meeting #79TD SP-170116 Mar. 21-23, 2018, Chennai, India(Update of SP-170382); SA WG2 Meeting #126 S2-182753; Feb. 26-Mar. 2, 2018, Montreal, Canada; Source:SA WG2; Title:Revised SID: Study on System enhancements for Provision of Access to Restricted Local Operator Services by Unauthenticated UEs.

RESTRICTED LOCAL OPERATOR SERVICES FOR A WIRELESS NETWORK

CROSS-REFERENCE TO RELATED APPLICATIONS

This application is a continuation of U.S. patent application Ser. No. 16/378,995, filed Apr. 9, 2019, which claims the benefit of U.S. Provisional Application No. 62/654,814, filed Apr. 9, 2018, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

DETAILED DESCRIPTION OF EMBODIMENTS

Example embodiments of the present disclosure enable implementation of enhanced features and functionalities in 4G systems. More particularly, the embodiments of the technology disclosed herein may relate to policy control for restricted local operator services. Throughout the present disclosure, UE, wireless device, and mobile device are used interchangeably.

Figure 1:
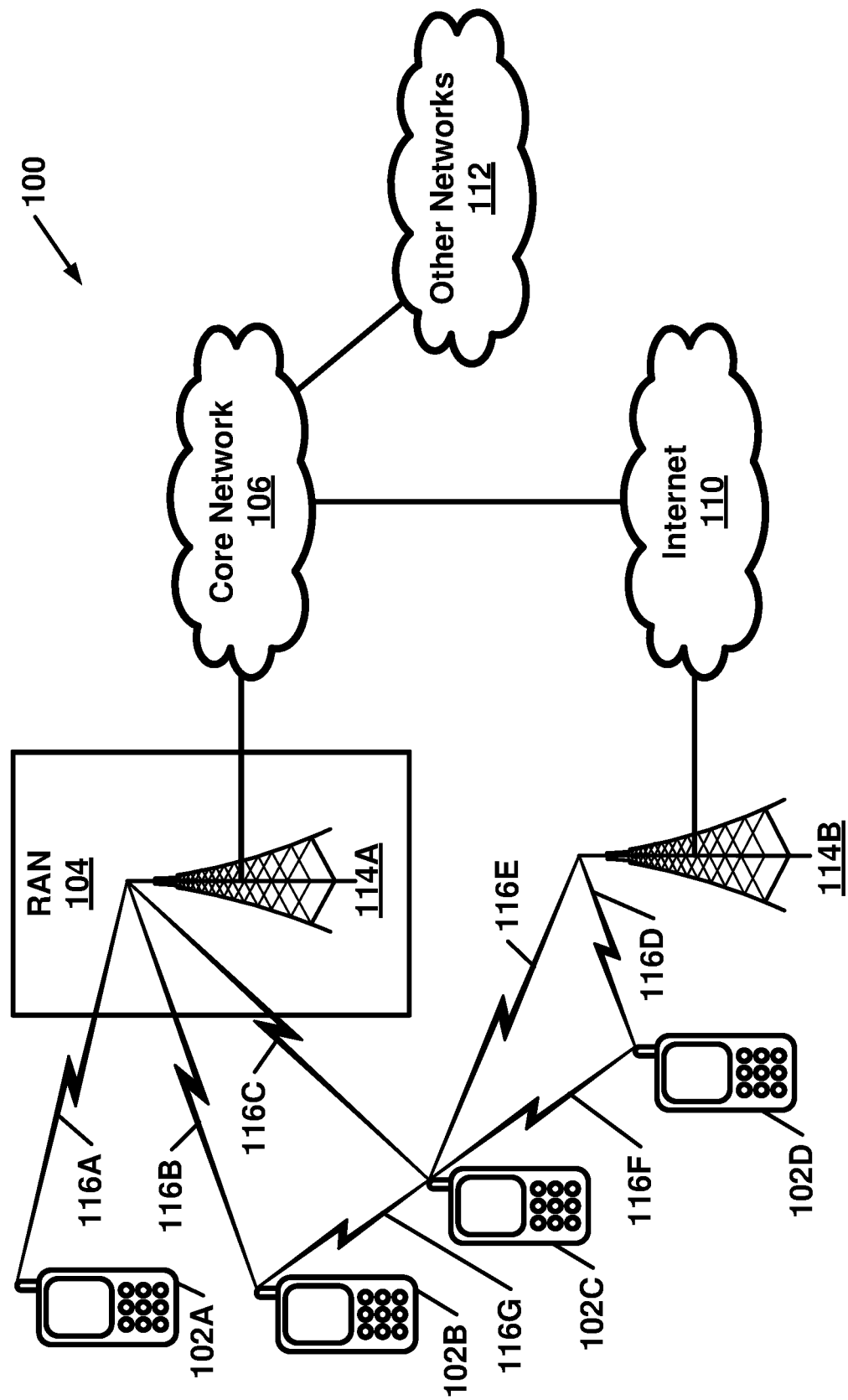
FIG. 1 is a system diagram of an example communications system as per an aspect of an embodiment of the present disclosure.

The following acronyms are used throughout the present disclosure:
4G 4th generation mobile networks
AF Application Function
AMBR Aggregate Maximum Bit Rate
AN Access Network
APN Access Point Name
AS Application Server
BBERF Bearer Binding and Event Reporting Function
CSCF Call Session Control Function
DPI Deep Packet Inspection
DL Downlink
eNB evolved Node B
eNodeB evolved Node B
EPS Evolved Packet System
E-UTRAN Evolved Universal Terrestrial Radio Access Network
GW Gateway
HSS Home Subscriber Server
I-CSCF Interrogating CSCF
IMEI International Mobile Equipment Identity
IMS IP Multimedia core network Subsystem
IMSI International Mobile Subscriber Identity
IoT Internet of things
IP-CAN IP Connectivity Access Network
LBI Linked EPS Bearer Identity
LGW Local Gateway
MEC Mobile Edge Computing
MME Mobility Management Entity
NAS Non-Access-Stratum
NF Network function
OCS Online Charging System
OFCS Offline Charging System
PCC Policy and Charging Control
PCO Protocol Configuration Options
PCEF Policy and Charging Enforcement Function
PCRF Policy and Charging Rules Function
P-CSCF Proxy CSCF
PDN Packet Data Network
PGW PDN Gateway
PLMN Public Land Mobile Network
PMIP Proxy Mobile IP
PTI Procedure Transaction Id
QoS Quality of Service
RAN Radio Access Network
RRC Radio Resource Control
RLOS Restricted Local Operator Service
S-CSCF Serving CSCF
SGW Serving Gateway
SIP Session Initiation Protocol
SIPTO Selected IP Traffic Offload
TAI Tracking Area identity
TEID Tunnel Endpoint Identifier
TDF Traffic Detection Function
UE User Equipment
UL Uplink
URI Uniform Resource Identifier
URL Uniform Resource Locator FIG. 1 is a diagram of an example communications system 100 in which one or more disclosed embodiments may be implemented. The communications system 100 may comprise a multiple access system configured to provide content, such as voice, data, video, messaging, broadcast, etc., to multiple wireless users. The communications system 100 may enable multiple wireless users to access such content through the sharing of system resources, including, for example, wireless bandwidth. For example, communications systems 100 may employ one or more channel access processes, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 1, the communications system 100 may comprise wireless transmit/receive units (WTRUs) 102A, 102B, 102C, 102D, a radio access network (RAN) 104, a core network 106, the Internet 110, and/or other networks 112. It will be appreciated that the disclosed embodiments contemplate various numbers of WTRUs, base stations, networks, and/or network elements. Each of the WTRUs 102A, 102B, 102C, 102D may be configured to operate and/or communicate in a wireless environment. By way of example, WTRUs 102A, 102B, 102C, 102D may be configured to transmit and/or receive wireless signals and may comprise user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, combinations thereof, and/or the like.

The communications systems 100 may also comprise a base station 114A and/or base station 114B. Each of the base stations 114A, 114B may be a type of device configured to wirelessly interface with at least one of the WTRUs 102A, 102B, 102C, 102D to facilitate access to one or more communication networks, such as core network 106, Internet 110 and/or networks 112. By way of example, base stations 114A and/or 114B may comprise a base transceiver station (BTS), a Node-B, an eNode B, a Home Node B, a Home eNode B, a site controller, an access point (AP), a wireless router, combinations thereof, and/or the like. While base stations 114A and 114B are each depicted as a single element, it will be appreciated that base stations 114A and 114B may comprise various numbers of interconnected base stations and/or network elements.

As illustrated, base station 114A may be a part of the RAN 104, which may also comprise other base stations and/or network elements (not shown), such as, for example, a base station controller (BSC), a radio network controller (RNC), relay nodes, combinations thereof, and/or the like. Base station 114A and/or the base station 114B may be configured to transmit and/or receive wireless signals within a particular geographic region, which may be referred to as a cell (not shown). The cell may be further divided into cell sectors. For example, the cell associated with the base station 114A may be divided into three sectors. Thus, according to an embodiment, base station 114A may comprise three transceivers, i.e., one for each sector of the cell. According to an embodiment, base station 114A may employ multiple-input multiple output (MIMO) technology and, therefore, may utilize multiple transceivers for each sector of the cell.

Base stations 114A and/or 114B may communicate with one or more of the WTRUs (e.g. 102A, 102B, 102C, and 102D) over an air interface (e.g. 116A, 116B, (116C and/or 116E), and 116D, respectively), which may comprise a wireless communication link (e.g., radio frequency (RF), microwave, infrared (IR), ultraviolet (UV), visible light, etc.). An air interface (e.g. 116A, 116B, 116C, 116D, 116E, 116F and 116G) may be established employing a suitable radio access technology (RAT).

More specifically, as noted above, communications system 100 may comprise a multiple access system and may employ one or more channel access schemes, such as CDMA, TDMA, FDMA, OFDMA, SC-FDMA, combinations thereof, and/or the like. For example, base station 114A in the RAN 104 and WTRUs 102A, 102B, and 102C may implement a radio technology such as Universal Mobile Telecommunications System (UMTS) Terrestrial Radio Access (UTRA), which may establish air interface (e.g. 102A, 102B, and 102C) employing wideband CDMA (WCDMA). WCDMA may comprise communication protocols such as High-Speed Packet Access (HSPA) and/or Evolved HSPA (HSPA+). HSPA may comprise High-Speed Downlink Packet Access (HSDPA) and/or High-Speed Uplink Packet Access (HSUPA).

According to an embodiment, base station 114A and WTRUs 102A, 102B, 102C may implement a radio technology such as Evolved UMTS Terrestrial Radio Access (E-UTRA), which may establish air interface (e.g. 116A, 116B, and 116C, respectively) employing Long Term Evolution (LTE) and/or LTE-Advanced (LTE-A).

According to an embodiment, base station 114A and WTRUs 102A, 102B, 102C may implement radio technologies such as IEEE 802.16 (i.e., Worldwide Interoperability for Microwave Access (WiMAX)), CDMA1000, CDMA1000 1×, CDMA1000 EV-DO, Interim Standard 1000 (IS-1000), Interim Standard 95 (IS-95), Interim Standard 856 (IS-856), Global System for Mobile communications (GSM), Enhanced Data rates for GSM Evolution (EDGE), GSM EDGE (GERAN), combinations thereof, and/or the like.

Base station 114B in FIG. 1 may comprise a wireless router, Home Node B, Home eNode B, or an access point, for example, and may utilize a RAT for facilitating wireless connectivity in a localized area, such as a place of business, a home, a vehicle, a campus, combinations thereof, and/or the like. According to an embodiment, base station 114B and WTRUs 102C, 102D may implement a radio technology such as IEEE 802.11 to establish a wireless local area network (WLAN). According to an embodiment, base station 114B and WTRUs 102C and 102D may implement a radio technology such as IEEE 802.15 to establish a wireless personal area network (WPAN). According to an embodiment, base station 114B and WTRUs 102C and 102D may utilize a cellular-based RAT (e.g., WCDMA, CDMA1000, GSM, LTE, LTE-A, etc.) to establish a picocell or femtocell. As shown in FIG. 1, base station 114B may have a direct connection to the Internet 110. Thus, base station 114B may not be required to access the Internet 110 via the core network 106.

The RAN 104 may be in communication with the core network 106, which may be a type of network configured to provide voice, data, applications, and/or voice over internet protocol (VoIP) services to one or more of the WTRUs 102A, 102B, 102C, and 102D. For example, core network 106 may provide call control, billing services, mobile location-based services, pre-paid calling, Internet connectivity, video distribution, etc., and/or perform high-level security functions, such as user authentication. Although not shown in FIG. 1, it anticipated that according to an embodiment, RAN 104 and/or core network 106 may be in direct or indirect communication with other RANs that employ the same RAT as the RAN 104 or a different RAT. For example, in addition to being connected to the RAN 104, which may utilize an E-UTRA radio technology, the core network 106 may also be in communication with another RAN (not shown).

Core network 106 may serve as a gateway for the WTRUs 102A, 102B, 102C and/or 102D to access the Internet 110 and/or other networks 112. The Internet 110 may comprise a global system of interconnected computer networks and devices that use common communication protocols, such as the transmission control protocol (TCP), user datagram protocol (UDP) and the internet protocol (IP) in the TCP/IP internet protocol suite. Other networks 112 may comprise wired and/or wireless communications networks owned and/or operated by other service providers. For example, the networks 112 may comprise another core network connected to one or more RANs, which may employ the same RAT as the RAN 104 or a different RAT.

Some or all of the WTRUs 102A, 102B, 102C, and 102D in the communications system 100 may comprise multi-mode capabilities (i.e., the WTRUs 102A, 102B, 102C, and 102D may comprise multiple transceivers for communicating with different wireless networks over different wireless links).

Figure 2:
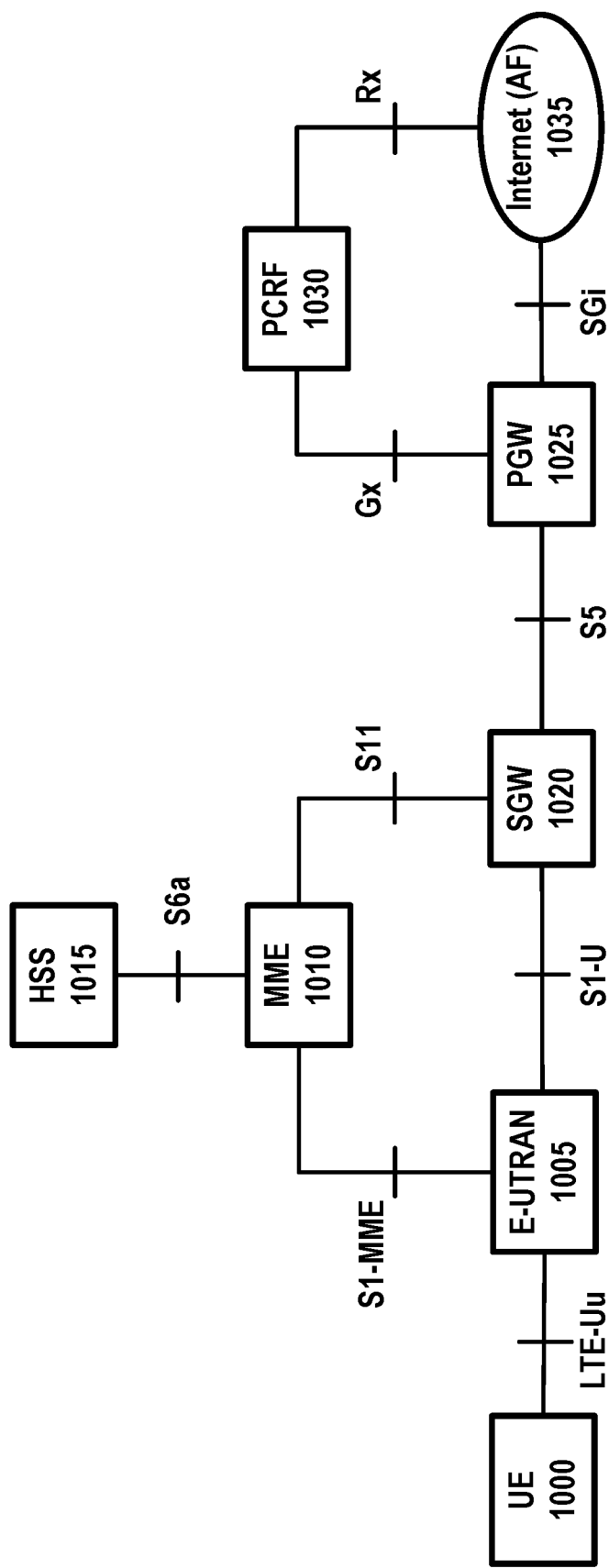
FIG. 2 is an example diagram of non-roaming 4G architecture for 3GPP accesses as per an aspect of an embodiment of the present disclosure.

FIG. 2 is an example diagram of non-roaming 4G architecture for 3GPP accesses. E-UTRAN 1005 may be an access network, and may have the function of Header compression and user plane ciphering, UL and DL bearer level admission control, UE-AMBR enforcement, etc. MME 1010 may have the function of NAS signaling, mobility management, session management, PDN GW and Serving GW selection, etc. HSS 1015 may be a database that contains user-related and subscriber-related information. It may provide supporting functions in mobility management, call and session setup, user authentication and access authorization. SGW 1020 may be a gateway which terminates the user plane interface towards the E-UTRAN. It may be the functionality of mobility anchoring for inter-3GPP mobility, and may have the function of packet routing and forwarding, and accounting for inter-operator charging, etc. PGW 1025 may be a gateway which terminates the SGi interface towards the PDN. It may comprise the function of per-user based packet filtering (by e.g. deep packet inspection), UE IP address allocation, and policy enforcement (e.g. QoS policy and charging policy enforcement). PCRF 1030 may be the policy and charging control element. It may make the QoS policy, charging policy and gating policy and send the policies to the PCEF (PGW) 1025 for enforcement. AF 1035 may be the application function, and it may provide the application related information to the PCRF 1030 for policy decision.

Figure 3:
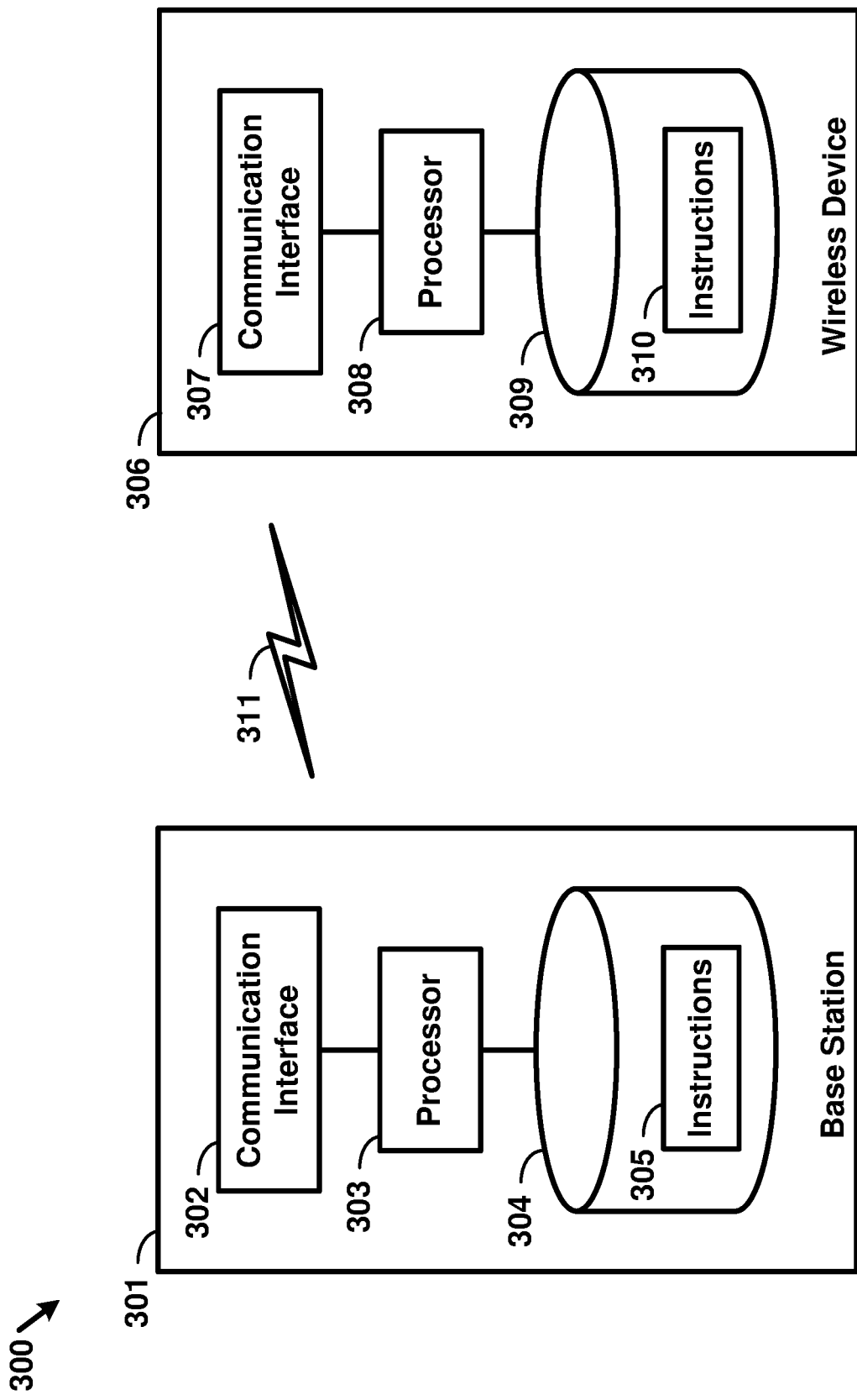
FIG. 3 is a block diagram of a base station and a wireless device as per an aspect of an embodiment of the present disclosure.

FIG. 3 is an example block diagram of a base station 301 and a wireless device 306, as per an aspect of an embodiment of the present invention. A communication network 500 may comprise at least one base station 301 and at least one wireless device 306. The base station 301 may comprise at least one communication interface 302, at least one processor 303, and at least one set of program code instructions 305 stored in non-transitory memory 304 and executable by the at least one processor 303. The wireless device 306 may comprise at least one communication interface 307, at least one processor 308, and at least one set of program code instructions 310 stored in non-transitory memory 309 and executable by the at least one processor 308. Communication interface 302 in base station 301 may be configured to engage in communication with communication interface 307 in wireless device 306 via a communication path that comprises at least one wireless link 311. Wireless link 311 may be a bi-directional link. Communication interface 307 in wireless device 306 may also be configured to engage in a communication with communication interface 302 in base station 301. Base station 301 and wireless device 306 may be configured to send and receive data over wireless link 311 using multiple frequency carriers. According to some of the various aspects of embodiments, transceiver(s) may be employed. A transceiver is a device that comprises both a transmitter and receiver. Transceivers may be employed in devices such as wireless devices, base stations, relay nodes, and/or the like.

Figure 4:
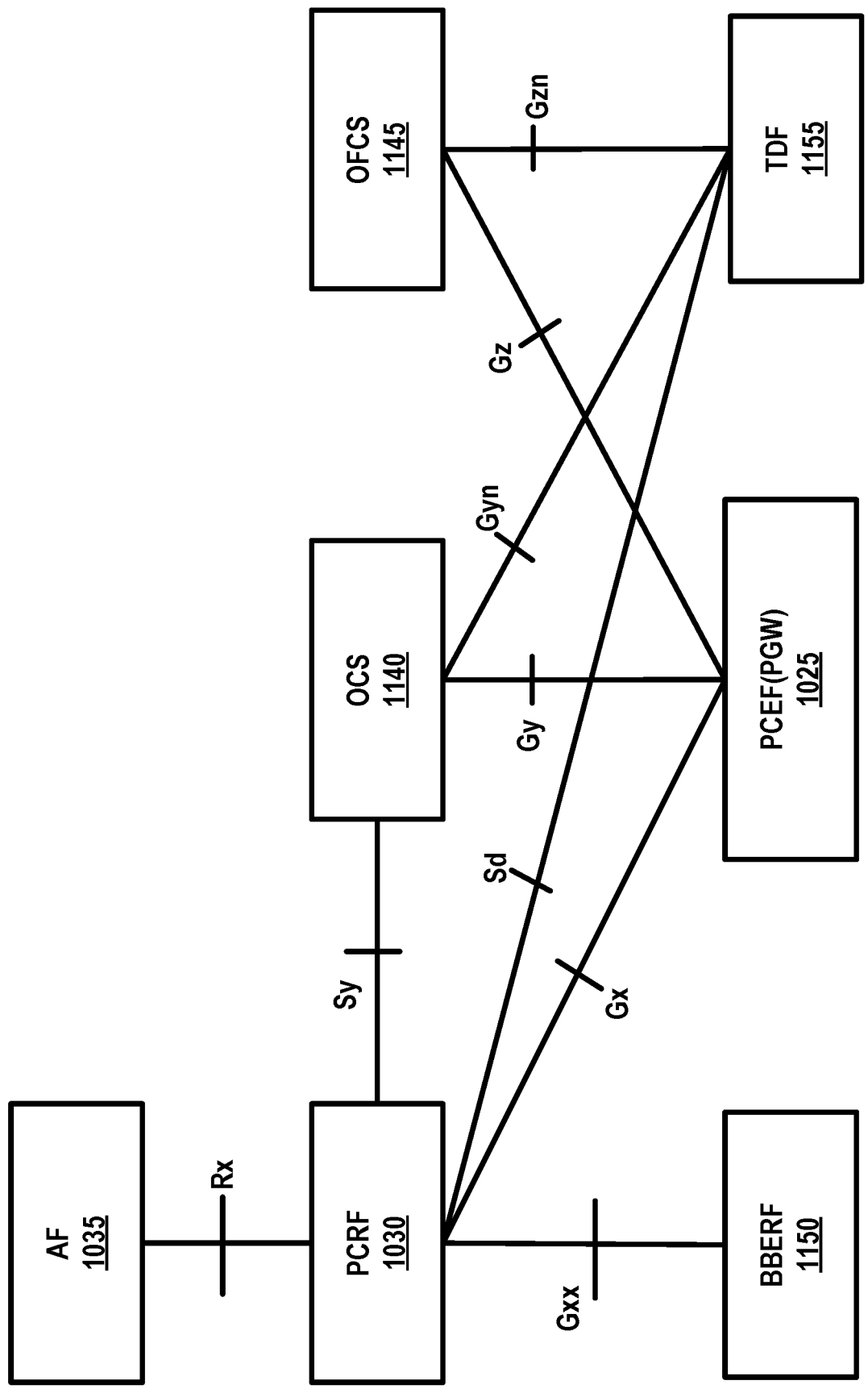
FIG. 4 is an example diagram of policy and charging control architecture as per an aspect of an embodiment of the present disclosure.

FIG. 4 is an example diagram of policy and charging control architecture. PCEF 1025 may be located in a PGW, and it mainly enforces the policy (e.g. QoS policy, charging policy and gating) received from the PCRF 1030. BBERF 1150 may be located in an SGW or non-3GPP access, and it may be used for PMIP-based S5/S8 or non-3GPP access scenario and enforce the QoS policy received from a PCRF. TDF 1155 may be the traffic detection function and may be used for the application detection with the DPI function. OCS 1140 may be the online charging system and may interact with the PGW 1025 or TDF 1155 to provide the online charging function. OFCS 1145 may be the offline charging system and may interact with the PGW 1025 or TDF 1155 to provide the offline charging function.

As an example, a serving network may need to broadcast its support to RLOS to all UEs that attempt an attach to a PLMN. This may enable the UE to act accordingly if access to such services are requested by the user and supported by the UE. A serving network may provide an access stratum broadcast indication to UEs when the operator supports RLOS. The indication may imply both the access network and IMS support RLOS. As an example, the access stratum broadcast indicator may be determined according to operators' preference and indicates that the PLMN, or all the PLMNs in the case of network sharing, in addition to IMS, support RLOS. As an example, a UE, that has not received access stratum broadcast indicator and is not being successfully authenticated by the serving network, may not be allowed to attach to the network for any services. As an example, the UE may need to understand the access stratum broadcast indicator, and an E-UTRAN may support the access stratum broadcast indicator.

As an example, UEs that require access to RLOS may include an indication in initial attach that access to RLOS may be required. An MME in serving network supporting RLOS services may be configured with an APN dedicated for RLOS. The MME may connect to a UE that included an RLOS indication in initial attach to the APN dedicated for RLOS (e.g., regardless of a successful or unsuccessful authentication). During PDN connection setup by the UE to the APN dedicated to RLOS, a PCRF may activate PCC rule(s) that may ensure that the UE is allowed to access a portal. The MME may be configured with the APN dedicated for RLOS and may implement the above functionality for authenticated and non-authenticated UEs. During initial attach, if the RLOS indication is included by the UE, and/or if UE authentication is not successfully authenticated, or authentication cannot be performed, the MME may initiate a session towards the configured APN dedicated to RLOS which connects the user to an operator portal for RLOS services. If the UE is successfully authenticated, the MME may initiate a session towards the configured APN dedicated to RLOS. In an example, the default APN in the UE profile may be overridden and/or modified. The attach request may comprise the RLOS indication to gain access to RLOS.

As an example, in order to access RLOS, a UE may perform an IMS registration and may include a feature tag to indicate its support for RLOS. A UE that may require access to RLOS may insert a RLOS supporting indication in a session initiation request. A P-CSCF supporting RLOS may be configured with a list of RLOS supported by an operator. In an example, a P-CSCF, an S-CSCF, and/or the like may support enabling unauthenticated users and/or authenticated users access to RLOS when an incoming session may include a RLOS supporting indication. Including the RLOS supporting indication by the UE to access RLOS in conjunction with a configured list of RLOS in the P-CSCF may ensure that no UE can access any other services when accessing RLOS. This may ensure that authenticated users may not use RLOS supporting indication to access other services and be charged at the RLOS rate, which may be free. The S-CSCF may ensure that RLOS supporting indication is included in a call detail/data record, charging data record (CDR), and/or the like. A P-CSCF supporting RLOS can also be used for IMS users.

A P-CSCF supporting RLOS may be configured with a list of RLOS services. A UE that requires access to RLOS may perform IMS registration and may include a feature tag to indicate its support for RLOS. If the user cannot be authenticated, the P-CSCF may create a temporary record and mark the user e.g., as "RLOS only user". The P-CSCF may send a request to a S-CSCF that supports RLOS. The S-CSCF may create a default profile for the UE, and the IMS registration may be accepted. For authenticated users, an I-CSCF may allocate to the UE a S-CSCF that may support RLOS at UE registration. In an example, the allocation may be based on a new capability information received by the I-CSCF during the UE registration. A UE that may require access to RLOS may insert an indicator in the session initiation request and include the requested RLOS in the Request-URI of the session initiation request. Upon receipt by a P-CSCF of session initiation request and if the P-CSCF supports RLOS, the P-CSCF may accept the session if the requested RLOS service in the incoming R-URI is configured in the P-CSCF. The P-CSCF may forward the incoming request to the S-CSCF allocated to the UE at registration. The P-CSCF may reject an incoming session without an RLOS indication for users marked as "RLOS only users". Upon receipt by a S-CSCF of an RLOS request and if the incoming request includes an RLOS indication, the S-CSCF may route the session towards the destination. No originating services may be permitted, i.e. the UE profile for authenticated users may not be considered. The S-CSCF may include in the CDR an indication that the session may be for RLOS. A HSS may support enabling a S-CSCF to declare RLOS as supporting capability. A Gm interface may be enhanced to enable conveying the RLOS indication. A Cx interface may support new RLOS capability.

As an example, a new system information blocks (SIB) provided by E-UTRAN may indicate that PLMN supports restricted local operator services and the level of support i.e. whether it is for unauthenticated and/or authenticated UEs or allows access to any UE. The PLMNs where RLOS is supported may be stored in universal integrated-circuit card (UICC) for the UE.

UE may see through SIB that PLMN supports Restricted Local Operator Services and the level of support i.e. whether it is for unauthenticated and/or authenticated UEs or allows access to any UE. If the SIB indicates support for authenticated and/or unauthenticated UEs, the UE in related state (authenticated or unauthenticated) may use Restricted Local Operator Services in PLMNs where the SIB is indicating support and are stored in UICC or ME (in case the UE is UICC-less). If the SIB indicates support for RLOS from any UE then UEs that do not have this PLMN stored in UICC or ME may use RLOS in this specific PLMN.

As an example, a new SIB provided by E-UTRAN may indicate that PLMN supports Restricted Local Operator Services. A UE may establish a PDN connection for Restricted Local Operator Services. If the UE is attached and already authenticated, the PDN connection for Restricted Local Operator Services may be established using a specific APN (that does not need to be standardized). If the UE is unauthenticated an indication in Attach message may be provided for Restricted Local Operator Services (this may be similar to the Emergency Attach indication that is used for "unauthenticated" UEs for emergency calls). The UE does not need to be authenticated, IMSI and IMEI (SV) may be retrieved from the UE. The MSISDN (if available) may be provided by the HSS. An MME may send a Create Session Request towards a PGW including the indication that is for RLOS, the IMSI, the IMEI (SV) and the MSISDN (if available). The PGW may establish an IP-CAN session with the PCRF. The IP-CAN session may be identified with UE's IPv4 address or IPv6 prefix associated with the PDN connection for RLOS. The IMSI, the IMEI (SV) and the MSISDN (if available) may be passed to the PCRF as part of the IP-CAN session establishment. The UE may complete the Attach procedure or UE may request PDN connection procedure.

As an example, if the UE is unauthenticated in IMS it may initiate IMS registration by sending a SIP REGISTER (UserID-1) message indicating that is IMS Registration for RLOS. Upon reception of the SIP REGISTER message, a P-CSCF may determine that it is for RLOS. The P-CSCF may request the PCRF for EPS-level identities (e.g. IMSI, IMEI (SV), MSISDN) in the Rx session establishment request. The PCRF may perform session binding based on the UE's IP address/prefix and provide one or more EPS-level identities and the MSISDN (if available) to the P-CSCF. Based on operator configuration for RLOS, the GPRS-IMS-Bundled Authentication (GIBA) procedure over Gm may be performed, the P-CSCF may responds with a 420 response with sec-agree value listed in the unsupported header field. UE may perform a new initial registration by sending a SIP REGISTER (UserID-2, IMEI) message and without inclusion of the Authorization header field. UserID-2 may be a public user identity derived from IMSI. P-CSCF may verify the IMSI/IMEI provided by the PCRF against the IMSI/IMEI derived from the public user identity provided by the UE, prior to accepting the SIP REGISTER message. P-CSCF may accept the registration with 200 OK and provides a tel-URI based on the MSISDN (if available) received from PCRF to the UE. UE may attempt an RLOS session by sending a SIP INVITE (UserID-3) message. UserID-3 may be set to UE's public identity. The P-CSCF may verify whether the UserID-3 indicated in the SIP INVITE message complies with the tel-URI that was provided to the UE. If compliant, P-CSCF may forwards the SIP INVITE towards the Call Centre that is providing the RLOS.

In an example, if the UE is aware that the user is requesting RLOS, then the UE may check whether the PLMN is advertising its support of RLOS to all UEs. If the PLMN does not advertise its support of RLOS, the UE may block the origination attempt. If the PLMN announces its support of RLOS, the UE may proceed to attach by sending an Attach Request in which it may indicate that the attachment is for RLOS (via e.g. Attach Type and/or Request Type) and it may provide its IMSI (or its IMEI if the UE has no IMSI). In an example, if the MME is not configured to support RLOS Attach, the MME may reject any Attach Request that indicates "RLOS" (using e.g. Attach Type).

When the UE has indicated that the attach request is for RLOS, and if the UE identifies itself with a temporary identity, the MME may reject the Attach Request. If the MME is configured to support RLOS for unauthenticated IMSIs and the UE has indicated that the attach request is for RLOS (via e.g. Attach Type "RLOS"), the MME may skip the authentication and security setup or the MME may accept that the authentication may fail and continues the attach procedure. If the UE has not indicated that the attach request is for RLOS and the authentication fails, and if the MME is configured to support RLOS, then the MME may accept the Attach request with an RLOS indication: this allows UE's aware they are making an RLOS attempt to avoid sending IMS Registration in case of IMS service. If the UE has not indicated that the attach request is for RLOS and the authentication fails, and if the MME is not configured to support RLOS, then the MME may reject the attach request. The ME identity may be transferred encrypted unless the UE performs RLOS Attach and cannot be authenticated. For an RLOS Attach, the UE may have included the IMEI in the RLOS Attach. If so, the ME Identity retrieval is skipped. For an RLOS Attach, the IMEI check to the EIR may be performed. If the IMEI is blocked, operator policies determine whether the RLOS Attach procedure continues or is stopped.

For an RLOS Attach in which the UE was not successfully authenticated, the MME may not send an Update Location Request to the HSS. For an RLOS Attach, the MME may not check for access restrictions, regional restrictions or subscription restrictions (e.g. CSG restrictions). For an RLOS Attach, the MME may ignore any unsuccessful Update Location Response from HSS and continue with the Attach procedure. For an RLOS Attach, the MME may apply parameters from MME RLOS Configuration Data for the RLOS bearer establishment performed in this step and any potentially stored IMSI related subscription data are ignored by the MME. For initial and handover RLOS Attach, the MME may select either a specific RLOS PGW in the same PLMN, preconfigured in the MME RLOS Configuration Data, or a dynamically allocated PGW in the same PLMN, based on a specific RLOS-APN. For RLOS attached UEs, IMSI is included if available and, if the IMSI cannot be authenticated, the IMSI may be marked as unauthenticated. The RLOS characteristics of the default PDN connection (i.e. APN-AMBR, MBR, ARP) may be pre-configured in the MME. PDN GWs may not perform any checks of Maximum APN Restriction if Create Default Bearer Request includes the RLOS APN. For RLOS attached UEs, IMSI may be included if available and if the IMSI cannot be authenticated then the IMSI may be marked as unauthenticated.

The P-GW and the PCRF may determine that RLOS are requested based on the RLOS APN received in Create Session Request message. For RLOS attached UEs which are unauthenticated, the PDN GW may provide the IMEI as the UE Identity instead of IMSI, to the PCRF. If the PCC is configured to support RLOS and if dynamic PCC is deployed, the PCRF, based on the RLOS APN, may set the ARP of the PCC rules to a value that is reserved for RLOS and the authorization of dynamic PCC rules. If dynamic PCC is not deployed, the PDN GW may use the ARP of the default RLOS EPS bearer for any potentially initiated dedicated RLOS EPS bearer. The new MME may send an Attach Accept with RLOS indication. For an RLOS attached UE, i.e. for UEs that have only RLOS EPS bearers established, there is no AS security context information included in the S1 control messages and there is no NAS level security when the UE cannot be authenticated. The RLOS Service Support indicator may inform the UE that RLOS bearer services are supported, i.e. the UE may be allowed to request PDN connectivity for RLOS.

As an example, during the attach procedure, based on the RLOS indication provided by the UE, the EPC may establish a PDN connection to a specific APN dedicated to RLOS. As RLOS are always provided in the PLMN the UE is accessing, the UE may need to select a P-CSCF suitable for RLOS sessions in that PLMN. For that, a P-CSCF address dedicated to RLOS may be provided in the PCO by the PGW during Attach procedure. This dedicated address enables the use of either a general-purpose P-CSCF or a RLOS-specific P-CSCF. The P-CSCF may detect that the UE is requesting thanks to the address at which the P-CSCF receives the SIP request, P-CSCF can then route the RLOS related SIP requests to a specific RLOS-CSCF to satisfy the IMS network isolation requirement (similar principle as for emergency IMS calls, which uses a specific E-CSCF). When provided, the network provided location information conveyed from the EPC to the P-CSCF may be forwarded to the RLOS-CSCF. Charging of RLOS IMS sessions may be performed by the IMS network as for a regular IMS sessions.

As an example, if a UE includes RLOS indication in Initial Attach, regardless of authentication successful or not, the existing mechanism of EPC charging, e.g. volume-based charging, time-based charging, can be reused to collect charging information. If the user is not authenticated successfully or cannot be authenticated, certain type of charging (e.g. flow-based charging) may not work. For users that are not authenticated successfully or cannot be authenticated, dedicated APN may be used for RLOS services, and in this case, the APN may provide the necessary info for charging. For users that are authenticated successfully, if dedicated APN is used for RLOS services, the APN provides necessary info for charging, as for non-authenticated users. If the dedicated APN for RLOS is not used, instead, a normal APN is used, separate Rating Group can be applied to the RLOS services if there is a need to differentiate charging. Based on the above, the existing charging mechanism is sufficient, and there is no need to add new functionality, e.g. there is no need to introduce new RLOS indication from MME to SGW and then to PGW.

Implementation of the existing technologies may have issues in supporting restricted local operator services. The existing technologies may have issues indicating the restricted local operator service information from a network function (e.g. application function) to the PCRF. The existing technologies may have issues how determining a restricted local operator service. The existing technologies may have issues indicating the restricted local operator services from the PCRF to the PGW and UE. In an example, when a UE requests a service that is not supported for the UE by the network, the application server may reject the service request from the UE, causing network resources to be wasted. Existing technologies may have issues detecting and limiting the service of the UE to the restricted local operator services.

Example embodiments provide enhanced mechanisms to indicate the restricted local operator service information from a network function (e.g. application function) to the PCRF. Example embodiments provide enhanced mechanisms to determine restricted local operator services. Example embodiments provides enhanced mechanisms to indicate the restricted local operator services to the PGW and the UE, so that the UE may access such services accordingly. The PGW may detect the user plan data traffic to ensure UE only access to the restricted local operator services.

In an example, a UE may send an indication in attach request message that the attach may be for restricted local operator service(s), RLOS. During the attach procedure, a PGW may send to a PCRF a policy request for restricted local operator service applied to an access point name (APN) and/or a wireless device. The PCRF may send to the PGW one or more policies for the restricted local operator service comprising restricted local operator service information. In an example, the PGW may enforce the one or more policies and send the restricted local operator service information to the UE through SGW and eNodeB.

Figure 5:
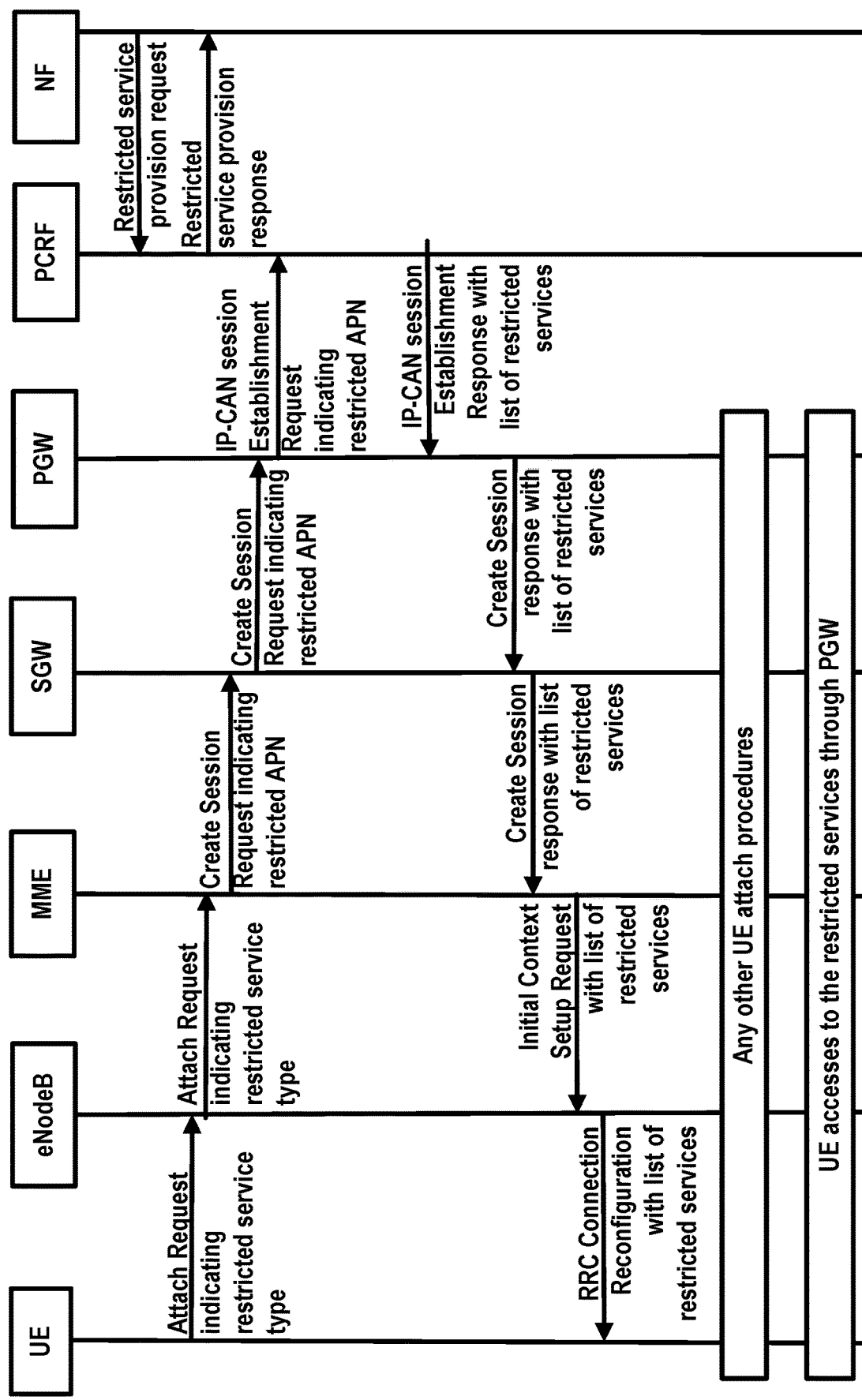
FIG. 5 is an example call flow diagrams depicting an initial attach procedure as per an aspect of an embodiment of the present disclosure.

FIG. 5 shows an example call flow which may comprise one or more actions. In an example, a PCRF may receive from a network function (NF) a message (e.g. a restricted service provision request) comprising at least one of: an information element indicating restricted local operator service information applied to any wireless device that may request restricted local operator service and/or may be unauthenticated in a PLMN; and an information element indicating an APN (e.g. RLOS APN) if the restricted local operator service information may be applied to the APN. The network function may comprise an application function (AF), an application server (AS), operations administration maintenance (OAM), and/or the like. The restricted local operator service information may comprise at least one of: an information element indicating a service type of one of the at least one restricted local operator service, an information element indicating application information associated with the service type, and/or the like. The application information may comprise a service data flow filter, an application identifier, a uniform resource locator (URL), and/or the like. As an example, the restricted service provision request message may be used to provide new restricted local operator service information or to update an existing restricted local operator service information. As an example, Diameter protocol may be used over the interface between the NF and the PCRF. In response to the message received from the NF, the PCRF may send to the NF a response message (e.g. a restricted service provision response message).

A UE may receive from a base station (e.g. an eNodeB) a first message (e.g. a broadcast message) indicating that a network (e.g. a PLMN) associated with the base station may support a restricted local operator service (RLOS). Based on one or more information elements of the first message, the UE may send to the eNodeB a first radio resource control (RRC) message comprising an attach request message. The attach request message may comprise one or more of the following parameters: last visited TAI (if available), UE core network capability, attach type, MS network capability, and/or the like. The attach request message may comprise one or more identifiers for the UE, e.g. IMSI, old GUTI, IMEI, and/or the like. The attach request message may comprise an indication that the attach is for restricted local operator service(s). In response to the message received from the UE, the eNodeB may forward to the MME the received attach request message comprising the identifier(s) of the UE and the indication that the attach is for restricted local operator service(s).

In response to the message received from the eNodeB, the MME may take one or more of the following actions: if the MME does not receive the indication that the attach is for restricted local operator service(s), the MME may take the authentication procedure for the UE. If the authentication result is failure (e.g. an UE roaming to a local operator, and there may be no roaming agreement between the local operator and a home operator for this UE), or the MME has received the indication that the attach is for restricted local operator service(s), the MME may select a gateway (e.g. SGW or combined SGW/PGW), and send to the SGW a message, e.g. a create session request message comprising one or more of the following parameters: MME TEID for control plane, RAT type, PGW address, PDN Address, default EPS bearer QoS, PDN type, subscribed APN-AMBR, EPS bearer Id, and/or protocol configuration options. As an example, the message may comprise the identifier(s) of the UE. As an example, the message may comprise an APN used for restricted local operator service(s), and/or a restricted local operator service indication indicating a session and/or a bear may be established for the restricted local operator service(s).

In response to the message received from the MME, the SGW may create a new entry in its EPS Bearer table and store the information received from the MME, and may send to a PGW a create session request message comprising the information received from the MME and one or more of the following parameters: Serving GW address for the user plane, Serving GW TEID of the user plane, Serving GW TEID of the control plane. In response to the message received from the SGW, the PGW may create a new entry in its EPS bearer context table, store the information received from the SGW, and generates a Charging Id for the default bearer. The new entry allows the PGW to route user plane PDUs between the S-GW and the packet data network. As an example, the PGW may allocate an IPv4 address and/or an IPv6 prefix for the UE based on the APN used for restricted local operator service(s), and/or the restricted local operator service indication received from the SGW.

The PGW may send to a PCRF a message (e.g. IP-CAN session establishment request) to get the policy (s) for an IP-CAN session, and/or the policy (s) for at least one restricted local operator service associated with an access point name (APN) for the UE. The message may comprise one or more of: a first information element indicating the identifier(s) of the UE; a second information element indicating the IPv4 address and/or the IPv6 prefix for the UE; and a third information element indicating the APN used for restricted local operator service(s) and/or a restricted local operator service indication. As an example, the PCRF may not be deployed in the network, in this case, the PGW may make the policy decision based on the information received from the SGW (e.g. the APN used for restricted local operator service(s) and/or the restricted local operator service indication), and/or the local operator configuration. The PGW may make one or more policies for the at least one restricted local operator service, wherein the one or more policies comprises restricted local operator service information comprising at least one of: an information element indicating a service type of one of the at least one restricted local operator service; or an information element indicating application information associated with the service type. The application information may comprise at least one of: a service data flow filter; an application identifier; or a uniform resource locator (URL). For the PCRF not deployed case, the interactions between the PGW and the PCRF in this embodiment can be omitted.

In response to the message received from the PGW, the PCRF may make the policy decision based on the information received from the PGW (e.g. the APN used for restricted local operator service(s) and/or the restricted local operator service indication), and/or the information received from the NF (e.g. restricted local operator service information), and/or local operator configuration. The PCRF may make one or more policies for the at least one restricted local operator service, wherein the one or more policies comprises restricted local operator service information comprising at least one of: a fourth information element indicating a service type of one of the at least one restricted local operator service; or a fifth information element indicating application information associated with the service type. The application information may comprise at least one of: a service data flow filter; an application identifier; or a uniform resource locator (URL).

The PCRF may send to a PCEF (e.g. the PGW) a message (e.g. IP-CAN session establishment response) by providing the policy (s) applied to service data flow(s) and/or the IP-CAN session for the restricted local operator service. As an example, the PCRF may send the policies along with the restricted local operator service information. As an example, the restricted local operator service information may be comprised as part of policy information. As an example, Diameter protocol may be used for the communication between the PCRF and the PGW. There may be example definitions for restricted local operator service information:

Restricted-Local-Operator-Service-Information AVP: The Restricted-Local-Operator-Service-Information AVP (AVP code x1) may be of type Grouped, and used to indicate restricted local operator service information. AVP Format: Restricted-Local-Operator-Service-Information::=<AVP Header: x1>
   [RLOS-Service-Type]
   *[RLOS-Application-Information]
   *[AVP]

RLOS-Service-Type AVP: The RLOS-Service-Type AVP (AVP code x2) may be of type Enumerated and may be used to identify a service type of a restricted local operator service. The following values may be defined. EMERGENCY (0): This value may be used to indicate an emergency service type of a restricted local operator service. VOLTE (1): This value may be used to indicate a voice over LTE service type of a restricted local operator service.

RLOS-Application-Information AVP: The RLOS-Application-Information AVP (AVP code x3) may be of type Grouped, and may be used to indicate application information of restricted local operator service information. AVP Format: RLOS-Application-Information::=<AVP Header: x3>
   [RLOS-Filter]
   *[RLOS-Application-Identifier]
   *[AVP]

RLOS-Application-Identifier AVP: The TDF-Application-Identifier AVP (AVP Code x5) may be of type OctetString and may reference the application detection filter (e.g. its value may represent an application such as Skype, or a list of URLs, etc.) for restricted local operator service.

RLOS-Filter AVP: The RLOS-Filter AVP (AVP Code x3) is of type IPFilterRule, and it defines the header filter information of a service data flow for restricted local operator service. The RLOS-Filter AVP may include the following information: Action may be set to "permit"; direction (in or out); protocol; source IP address; source port (single value) for UDP tunneling; destination IP address; and/or destination port (single value) for UDP tunneling.

The IPFilterRule type may be used with restrictions. For example, options may not be used, the invert modifier "!" for addresses may not be used, the direction "out" may refer to downlink direction, and the direction "in" may refer to uplink direction.

As an example, the PCRF may send to the PGW (PCEF) one or more of the following policies: QoS policy, charging policy, gating policy and/or redirect policy. The redirect policy may be used to redirect the UE traffic to a redirect server address. As an example, the redirect server address comprised in the redirect policy may be one or more of: an IPv4 address, IPv6 Prefix, URL, or FQDN. As an example, if the PGW detects an uplink traffic which is not a restricted local operator service, the PGW may enforce the redirect policy by redirecting the traffic to the redirect server address (e.g. a web portal of a local operator). As an example, PCRF may send to the PGW gating policy, the PGW may enforce the gating policy by discard the traffic packet which is not a restricted local operator service.

In response to the message received from the PCRF, the PGW may install the policy(ies) received from the PCRF and may enforce the policy(ies) for the restricted local operator service. The PGW may send to the SGW a create session response message comprising one or more of the following parameters: PGW address for the user plane, PGW TEID of the user plane, PGW TEID of the control plane, PDN Type, PDN Address, EPS bearer Id, EPS bearer QoS, charging Id, and/or APN-AMBR).

Figure 7:
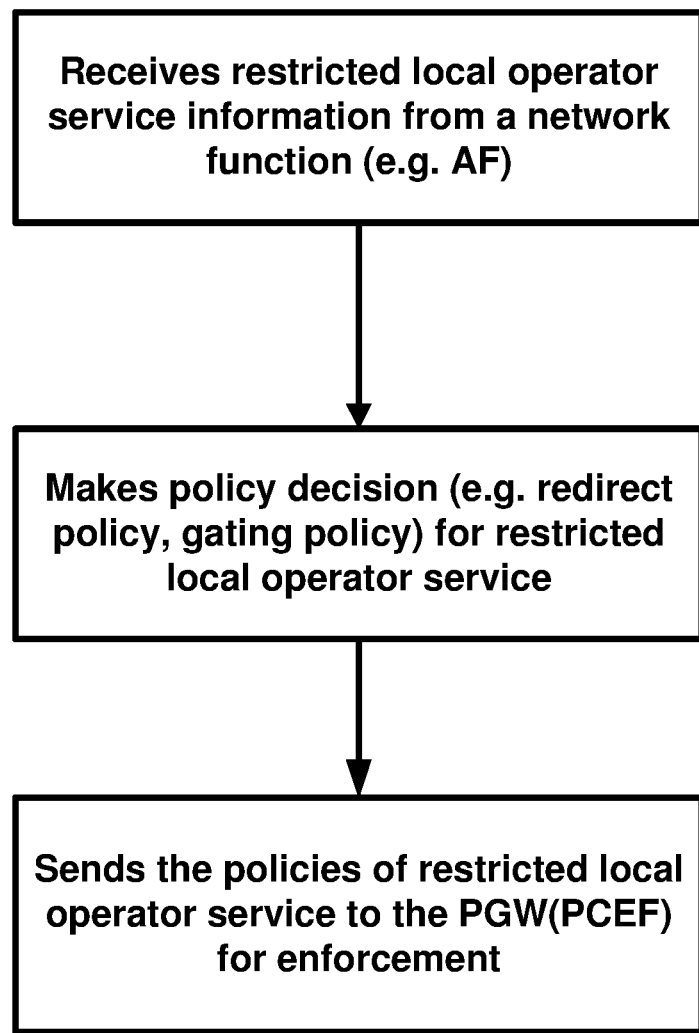
FIG. 7 is a diagram depicting an example procedure of a PCRF as per an aspect of an embodiment of the present disclosure.
Figure 8:
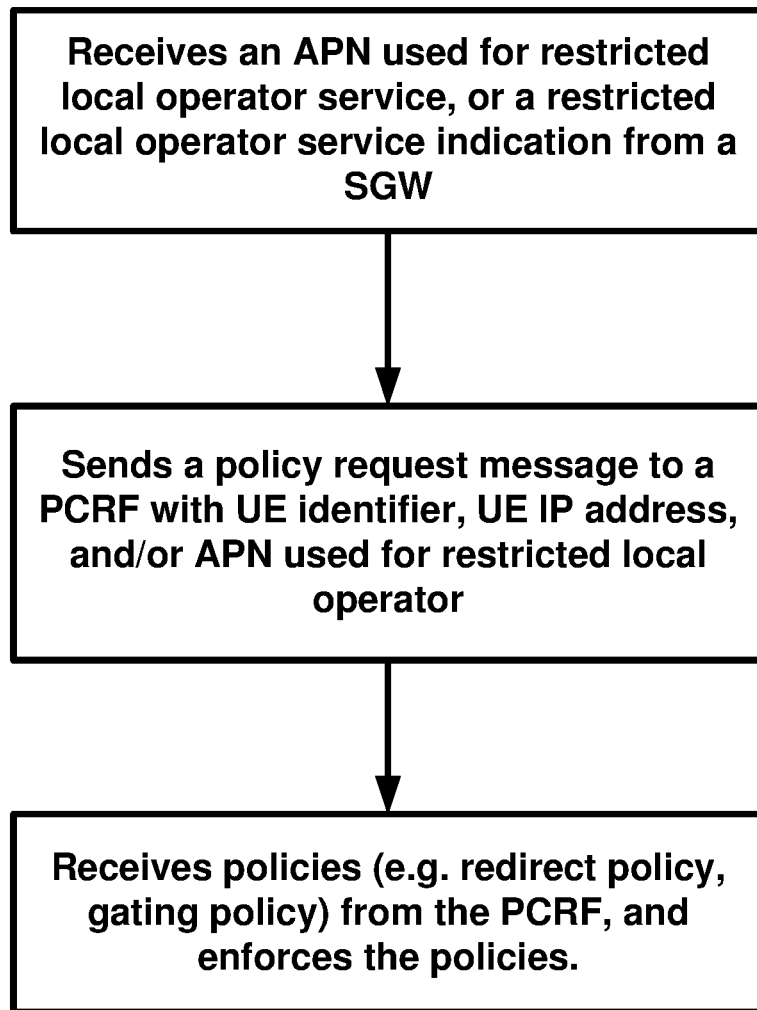
FIG. 8 is a diagram depicting an example procedure of a PGW as per an aspect of an embodiment of the present disclosure.

The create session message may comprise restricted local operator service information. FIG. 7 is a diagram depicting an example procedure of a PCRF as per an aspect of an embodiment of the present disclosure. FIG. 8 is a diagram depicting an example procedure of a PGW as per an aspect of an embodiment of the present disclosure.

In response to the message received from the PGW, the SGW may correlate the Serving GW Address for the user plane and Serving GW TEID of the user plane, with the PGW address for the user plane and PGW TEID of the user plane received from the PGW. In response to the message received from the MME, the SGW may response to the MME a create session response message comprising at least one of: PDN Type, PDN address, SGW address for User Plane, SGW TEID for User Plane, SGW TEID for control plane, EPS bearer Id, EPS bearer QoS, PGW address and TEID (GTP-based S5/S8) at the PGW for uplink traffic and/or APN-AMBR. The message may comprise restricted local operator service information received from the PGW.

The MME may send to the eNodeB an attach accept message comprising one or more of the following parameters: GUTI, TAI List, and/or session management request message, where the session management request message may comprise one or more of the following parameters: APN, PDN type, PDN address, EPS bearer Identity, protocol configuration options, header compression configuration. The attach accept message may be contained in an S1_MME control message initial context setup request. The S1-AP initial context setup request message may also comprise the EPS bearer QoS, the UE-AMBR, EPS bearer Identity, as well as the TEID at the Serving GW used for user plane and the address of the Serving GW for user plane. The attach accept message may comprise the restricted local operator service information.

Figure 9:
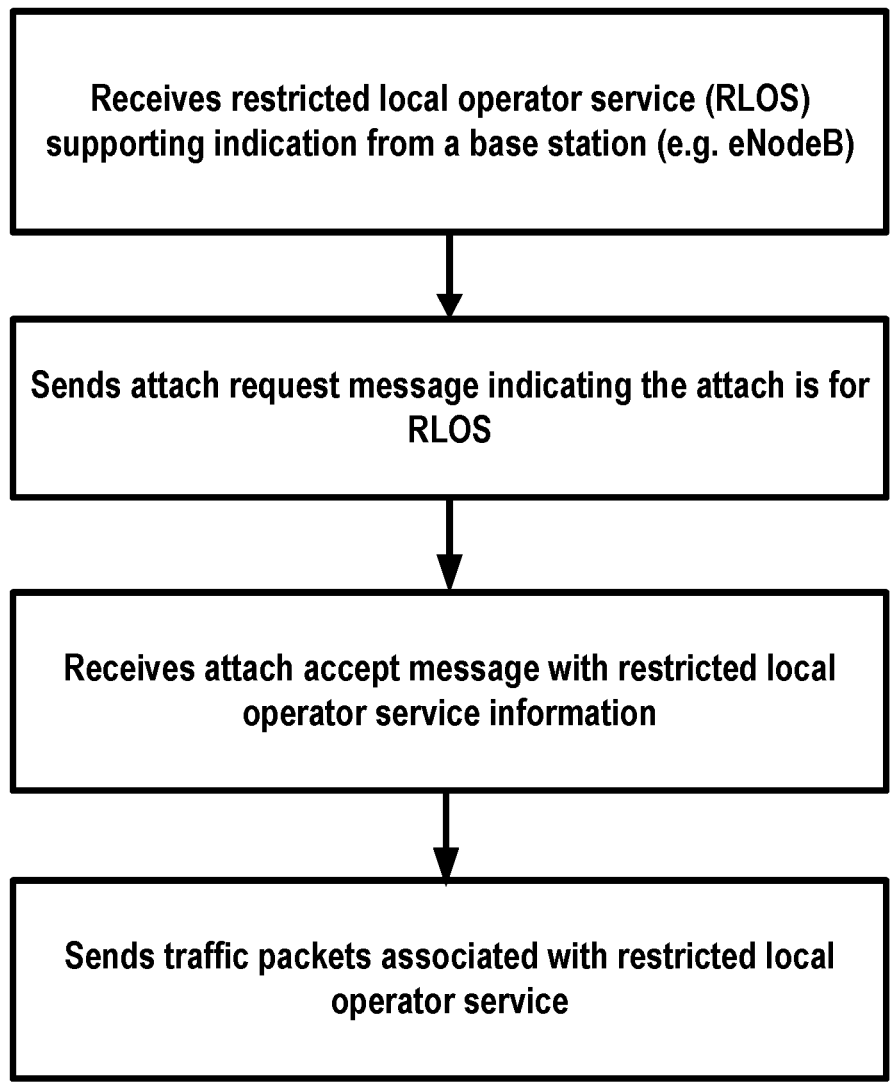
FIG. 9 is an diagram depicting an example procedure of a UE as per an aspect of an embodiment of the present disclosure.

In response to the message received from the MME, the eNodeB may send to the UE a RRC connection reconfiguration message comprising EPS radio bearer identity, and the attach accept message will be sent along to the UE, and/or the restricted local operator service information. The restricted local operator service information may be comprised in the attach accept message, and/or along with the attach accept message. Other signaling interactions may be performed by UE, eNodeB, MME and SGW to complete the attach procedure. After the attach procedure, the UE may access the restricted local operator service(s) through the PGW. As an example, the UE may send traffic packet to a server for restricted local operator service (e.g. VoLTE). FIG. 9 is an example diagram depicting a procedure of UE as per an aspect of an embodiment of the present disclosure.

In an example, a PCRF may receive restricted local operator service information from a network function, and the PCRF may make policy(ies) for the restricted local operator service(s) based on the information received. The PCRF may send to a PGW one or more policies for the restricted local operator service comprising restricted local operator service information, the PGW may enforce the policies and send the restricted local operator service information to UE through SGW and eNodeB.

Figure 6:
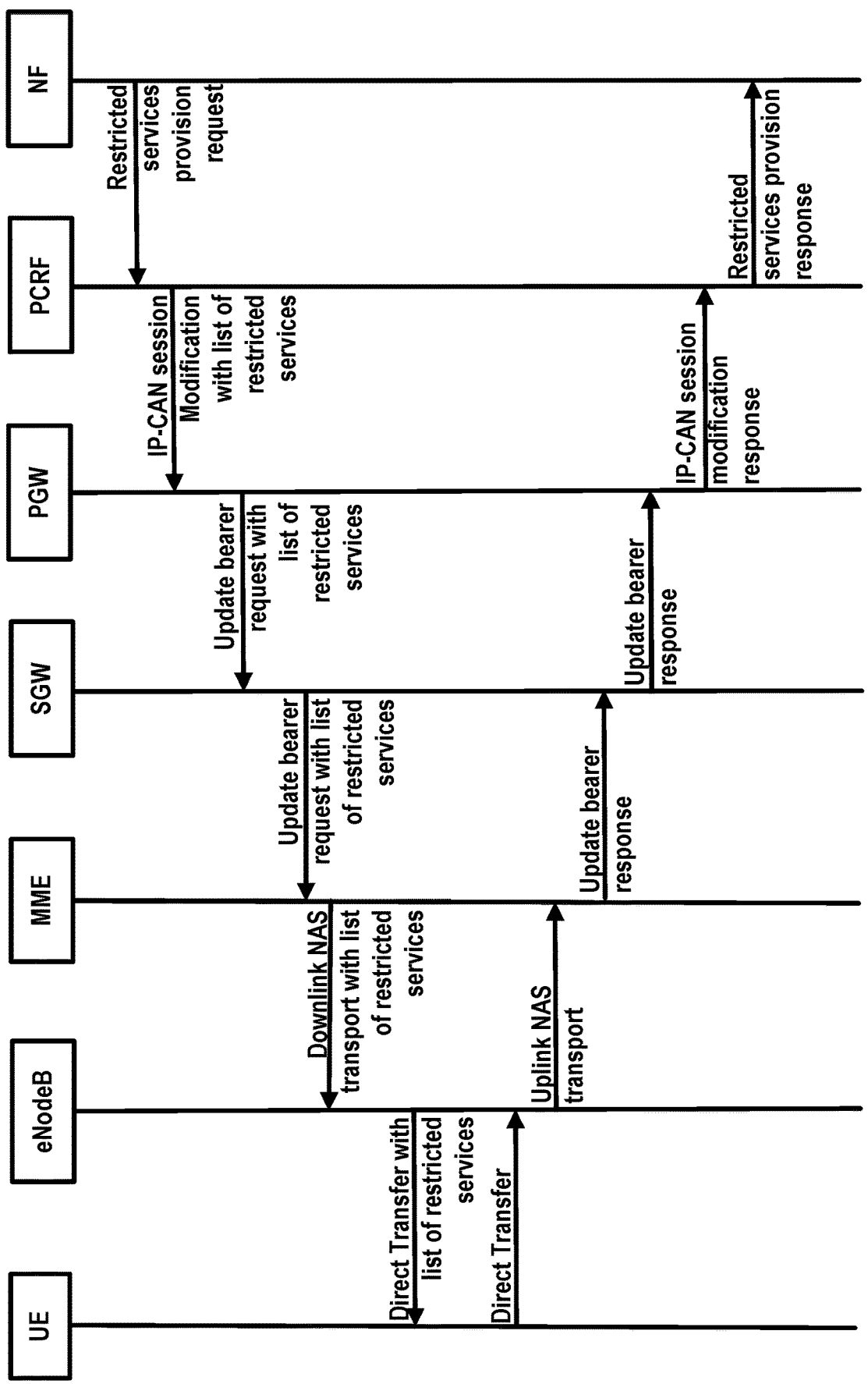
FIG. 6 is an example diagram depicting IP-CAN session modification procedure as per an aspect of an embodiment of the present disclosure.

FIG. 6 shows an example call flow which may comprise one or more actions. A PCRF may receive from a network function (NF) a message (e.g. restricted service provision request) comprising restricted local operator service information. The network function may comprise one of: an application function (AF); an application server (AS); or operations administration maintenance (OAM). The restricted local operator service information may comprise at least one of: an information element indicating a service type of one of the at least one restricted local operator service; or an information element indicating application information associated with the service type. The application information may comprise at least one of: a service data flow filter; an application identifier; or a uniform resource locator (URL). As an example, the restricted service provision request message may be used to provide new restricted local operator service information or update the existing restricted local operator service information.

In response to the message received from the NF, the PCRF may make policy decision based on the information received (e.g. restricted local operator service information), and/or the local operator configuration. The PCRF may make one or more policies for the at least one restricted local operator service, wherein the one or more policies comprises restricted local operator service information comprising at least one of: an information element indicating a service type of one of the at least one restricted local operator service; or an information element indicating application information associated with the service type. The application information may comprise at least one of: a service data flow filter; an application identifier; or a uniform resource locator (URL). The PCRF may send to the PGW a message (e.g. IP-CAN session modification request) by providing the policy (s) applied to service data flow(s) and/or the IP-CAN session for the restricted local operator service. As an example, the PCRF may send the policies along with the restricted local operator service information. As an example, the restricted local operator service information may be comprised as part of policy information. As an example, the PCRF may send to the PGW one or more of the following policies: QoS policy, charging policy, gating policy and/or redirect policy. The redirect policy may be used to redirect the UE traffic to a redirect server address. As an example, the redirect server address comprised in the redirect policy may be one or more of: an IPv4 address, IPv6 Prefix, URL, or FQDN. As an example, if the PGW detects an uplink traffic which is not a restricted local operator service, the PGW may enforce the redirect policy by redirecting the traffic to the redirect server address (e.g. a web portal of a local operator).

In response to the message received from the PCRF, the PGW may determine to create a new dedicated bearer or update an existing bearer. As an example, the PGW may determine to update an existing dedicated bearer, and the PGW may send to an SGW an update bearer request message comprising the restricted local operator service information. In response to the message received from the PGW, the SGW send to an MME an update bearer request message comprising the restricted local operator service information. In response to the message received from the SGW, the MME may build a session management request message and send to an eNodeB a downlink NAS transport (session management configuration) message comprising restricted local operator service information. In response to the message received from the MME, the eNodeB may send to a UE a direct transfer (session management request) message comprising restricted local operator service information. In response to the message received from the eNodeB, the UE may send to the eNodeB a RRC connection reconfiguration complete message. The UE NAS layer may build a session management response, and the UE then sends to the eNodeB a direct transfer (session management response) message. In response to the message received from the UE, the eNodeB may send to the MME an uplink NAS transport (session management response) message. In response to the message received from the eNodeB, the MME may send to the SGW an update bearer response message. In response to the message received from the MME, the SGW may send to the PGW an update bearer response message. In response to the message received from the SGW, the PGW may send to the PCRF a response message. In response to the message received from the PGW, the PCRF may send to the NF a restrict services provision response. The UE may access the restricted local operator service(s) through the PGW.

As an example, a policy and charging rule function (PCRF) may receive from a network function (NF), a first message comprising restricted local operator service information, wherein the restricted local operator service information comprises at least one of: a first information element indicating a service type of one of at least one restricted local operator service; or a second information element indicating application information associated with the service type. The PCRF may determine and based on the restricted local operator service information, one or more policies of the at least one restricted local operator service for a wireless device. The PCRF may send to a PGW, a second message indicating an IP-CAN session establishment/modification for the wireless device, wherein the second message may comprise the one or more policies; and the restricted local operator service information. As an example, the PCRF may determine the one or more policies further based on a IP-CAN session establishment request message from the PGW for the wireless device. As an example, the application information may comprise at least one of: a service data flow filter; an application identifier; or a uniform resource locator (URL).

As an example, the one or more policies may further comprise at least one of: a fifth information element indicating a redirect policy; a sixth information element indicating a gating policy; a seventh information element indicating a quality of service (QoS) policy; or an eighth information element indicating a charging policy. As an example, the PGW may send to a serving gateway, an update bearer request message comprising restricted local operator service information. As an example, the serving gateway may send to a mobility management entity in response to the update bearer request message, an update bearer request message comprising restricted local operator service information. As an example, the MME may send to a base station a downlink NAP transport message comprising restricted local operator service information. As an example, the base station may send to the wireless device, a direct transfer message comprising restricted local operator service information. In an example, a wireless device may receive from a base station a first message indicating that a network associated with the base station supports a restricted local operator service (RLOS). The wireless device may send to the base station and based on the first message a first radio resource control message comprising an attach request message to a core network entity, wherein the attach request message comprises a parameter indicating a request for the RLOS.

The wireless device may receive from the base station and in response to the attach request message, a second radio resource control message comprising an attach accept message from the core network entity, wherein the attach accept message comprises restricted local operator service information comprising at least one of: a first information element indicating a service type of one of at least one restricted local operator service allowed for the wireless device; or a second information element indicating application information associated with the service type. Based on the restricted local operator service information, the wireless device may send one or more traffic packets associated with the one of at least one restricted local operator service. As an example, the first message may comprise a system information block. As an example, the first radio resource control message may comprise at least one of: a radio resource control connection setup complete message; or a radio resource control connection request message. As an example, the wireless device may transmit to the base station and based on the first message, a random access preamble for initiation of a random access procedure associated with the attach request. The wireless device may receive from the base station and in response to the random access preamble, a random access response for the random access procedure. The wireless device may transmit to the base station, a radio resource control connection request message indicating a request of a radio resource control connection with the base station, wherein the radio resource control connection request message comprises at least one of: a connection establishment cause indicating that the radio resource control connection is for the RLOS; or an identifier of the wireless device. The wireless device may receive from the base station and in response to the radio resource control connection request message, a radio resource control connection setup message indicating an acceptance of the request of a radio resource control connection. The wireless device may send the first radio resource control message in response to the radio resource control connection setup message. As an example, the base station may determine whether accepting the request of a radio resource control connection of the wireless device based on the connection establishment cause.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 10:
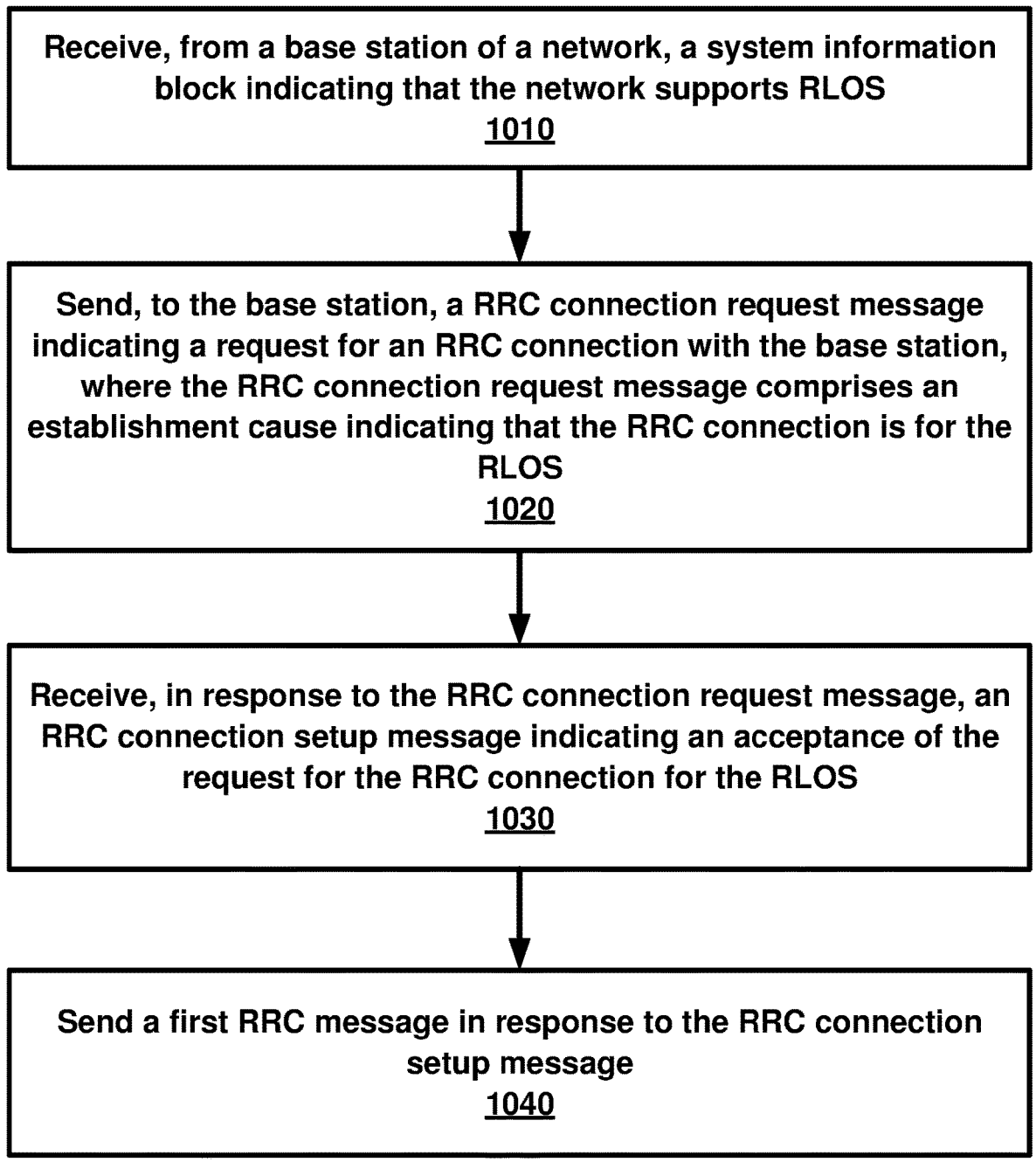
FIG. 10 is an example flow diagram as per an aspect of an embodiment of the present disclosure.

FIG. 10 is an example flow diagram as per an aspect of an embodiment of the present disclosure. At 1010, a wireless device may receive from a base station of a network, a system information block indicating that the network supports restricted local operator services (RLOS). At 1020, the wireless device may send a radio resource control connection (RRC) connection request message to the base station. The RRC connection request message may indicate a request for an RRC connection with the base station. The RRC connection request message may comprise an establishment cause indicating that the RRC connection is for the RLOS. At 1030, the wireless device may receive an RRC connection setup message in response to the RRC connection request message. The RRC connection setup message may indicate an acceptance of the request for the RRC connection for the RLOS. At 1040, the wireless device may send a first RRC message in response to the RRC connection setup message.

According to an example embodiment, the base station may determine to accept the request for the RRC connection based on the establishment cause. According to an example embodiment, the RRC connection request message may comprise an identifier of the wireless device. According to an example embodiment, the first RRC message may be an RRC connection setup complete message. According to an example embodiment, the system information block may indicate a level of support for the RLOS. According to an example embodiment, the wireless device may send a random access preamble to the base station. The random access preamble may be for initiation of a random access procedure for the RRC connection. According to an example embodiment, the wireless device may receive a random access response for the random access procedure from the base station in response to the random access preamble. The RRC connection request message may be based on the random access response.

Figure 11:
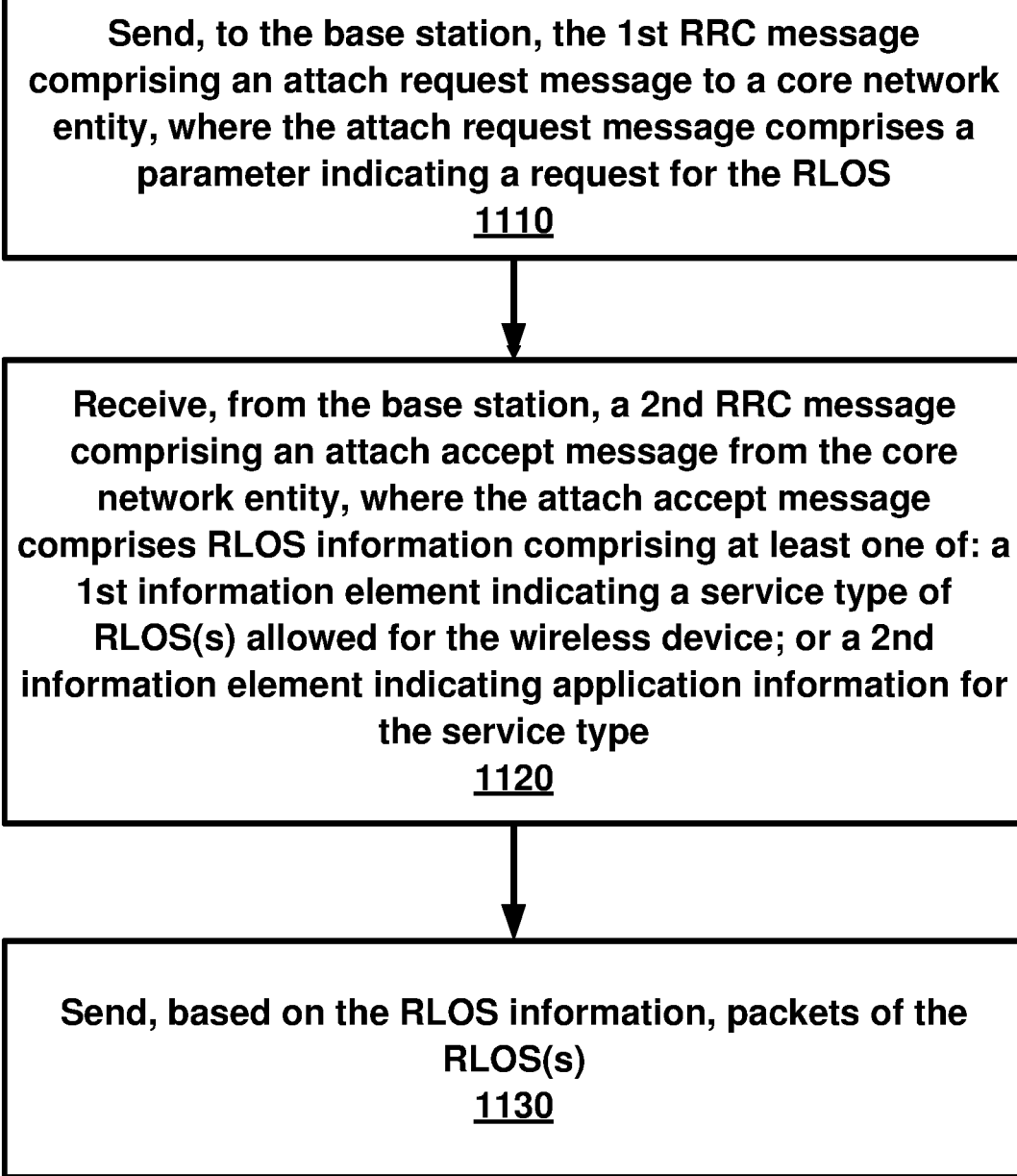
FIG. 11 is an example flow diagram as per an aspect of an embodiment of the present disclosure.

FIG. 11 is an example flow diagram as per an aspect of an embodiment of the present disclosure. According to an example embodiment, the wireless device may send the first RRC message to the base station at 1110. The first RRC message may comprise an attach request message to a core network entity. The attach request message may comprise a parameter indicating a request for the RLOS. According to an example embodiment, the wireless device may receive a second RRC message from the base station at 1120. The second RRC message may comprise an attach accept message from the core network entity. The attach accept message may comprise RLOS information. The RLOS information may comprise a first information element indicating a service type of at least one RLOS allowed for the wireless device. The RLOS information may comprise a second information element indicating application information for the service type. According to an example embodiment, the wireless device may send packets of the at least one RLOS at 1130, based on the RLOS information.

According to an example embodiment, the core network entity may comprise a mobility management entity (MME). According to an example embodiment, the at least one RLOS allowed for the wireless device may comprise an emergency service. According to an example embodiment, the at least one RLOS allowed for the wireless device may comprise a voice over long term evolution (VOLTE) service. According to an example embodiment, the application information may comprise a service data flow filter. According to an example embodiment, the application information may comprise an application identifier. According to an example embodiment, the application information may comprise a uniform resource locator (URL). According to an example embodiment, the first RRC message further may comprise an RRC connection setup complete message.

Figure 12:
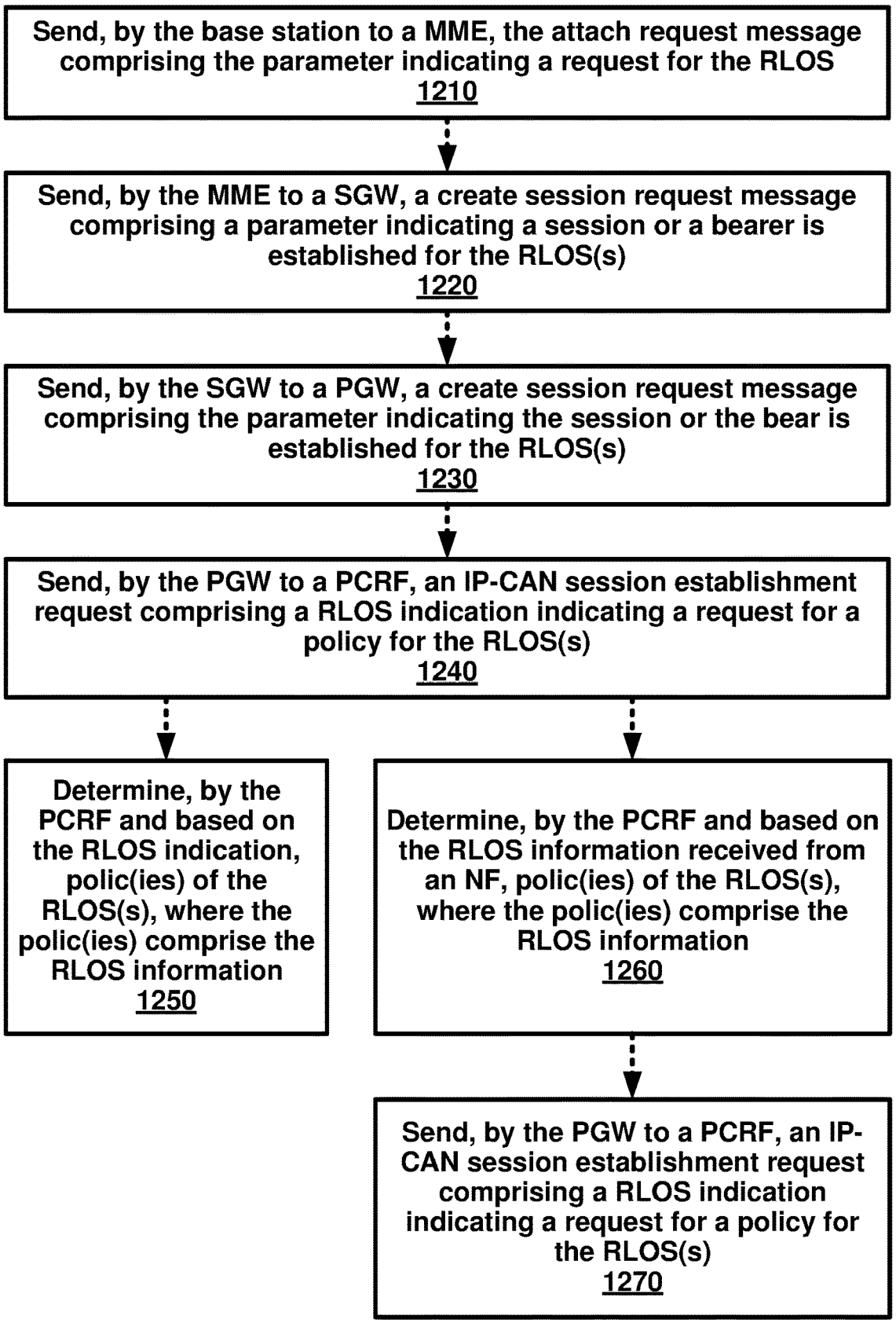
FIG. 12 is a flow diagram of example aspects of embodiments of the present disclosure.

FIG. 12 is a flow diagram of example aspect(s) of embodiment(s) of the present disclosure. According to an example embodiment, at 1210, the base station may send the attach request message to a mobility management entity (MME). The attach request message may comprise the parameter indicating a request for the RLOS. According to an example embodiment, at 1220, the MME may send a create session request message to a serving gateway (SGW). The create session request message may comprise a parameter indicating a session or a bearer is established for the at least one RLOS. According to an example embodiment, the SGW may send a create session request message to a packet data network gateway (PGW) at 1230. The create session request message may comprise the parameter indicating the session or the bear is established for the at least one RLOS. According to an example embodiment, the PGW may send an internet protocol connectivity access network (IP-CAN) session establishment request to a policy and charging rules function (PCRF) at 1230. The IP-CAN session establishment request may comprise a RLOS indication indicating a request for a policy for the at least one RLOS. According to an example embodiment, based on the RLOS indication, the PCRF may determine one or more policies of the at least one RLOS at 1250. The one or more policies of the at least one RLOS may comprise the RLOS information. According to an example embodiment based on the RLOS information received from an NF, the PCRF may determine one or more policies of the at least one RLOS, at 1260. The one or more policies may comprise the RLOS information. According to an example embodiment, the PCRF may send an IP-CAN session establishment response message to the PGW at 1270. The IP-CAN session establishment response message may comprise the RLOS information.

Figure 13:
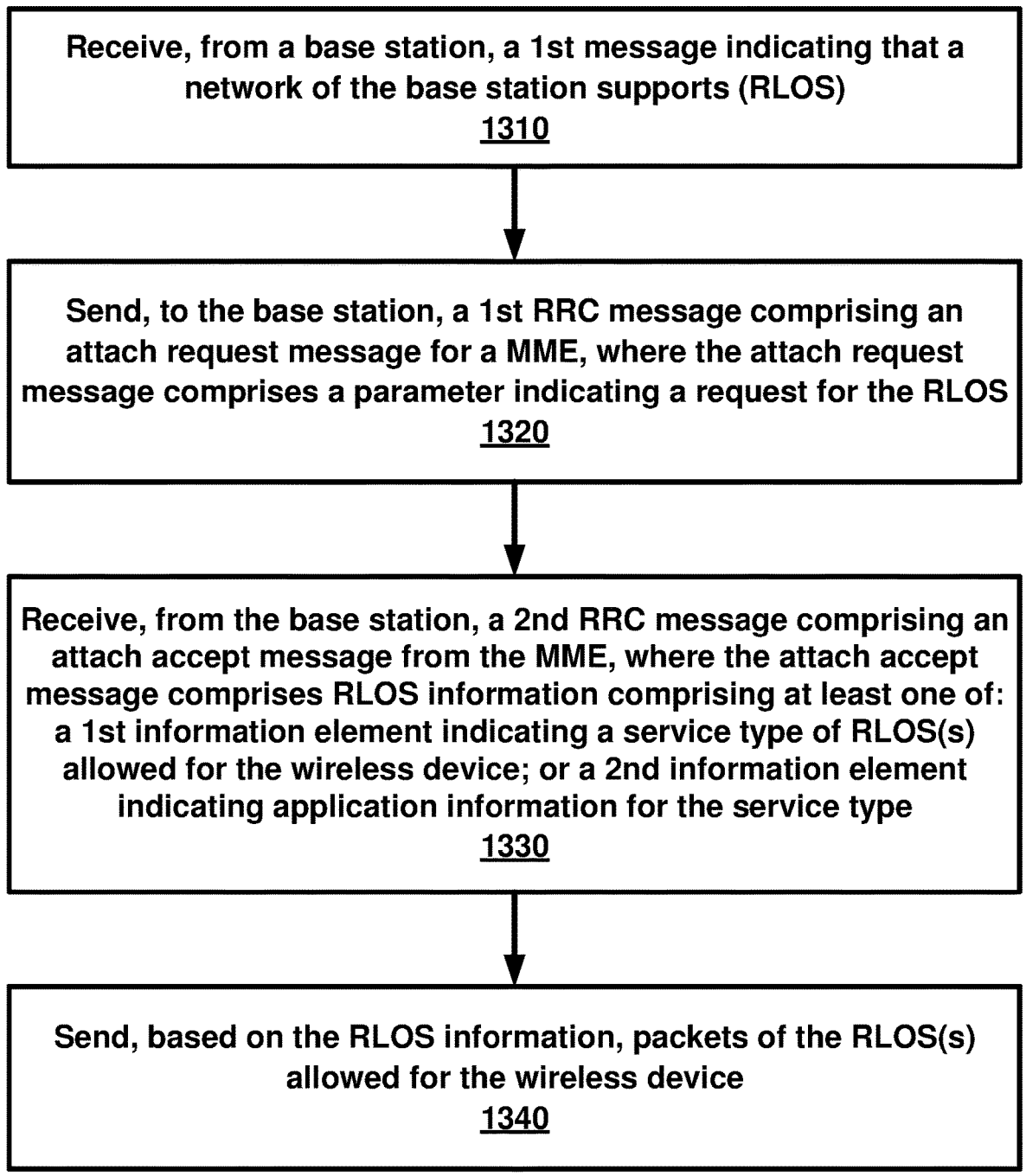
FIG. 13 is an example flow diagram as per an aspect of an embodiment of the present disclosure.

FIG. 13 is an example flow diagram as per an aspect of an embodiment of the present disclosure. At 1310, a wireless device may receive a first message from a base station. The first message may indicate that a network of the base station supports restricted local operator services (RLOS). At 1320, the wireless device may send a first radio resource control (RRC) message to the base station. The first RRC message may comprise an attach request message for a mobility management entity (MME). The attach request message may comprise a parameter indicating a request for the RLOS. At 1330, the wireless device may receive a second RRC message from the base station. The second RRC message may comprise an attach accept message from the MME. The attach accept message may comprise RLOS information. The RLOS information may comprise a first information element indicating a service type of at least one RLOS allowed for the wireless device. The RLOS information may comprise a second information element indicating application information for the service type. At 1340, the wireless device may send, based on the RLOS information, packets of the at least one RLOS allowed for the wireless device.

Figure 14:
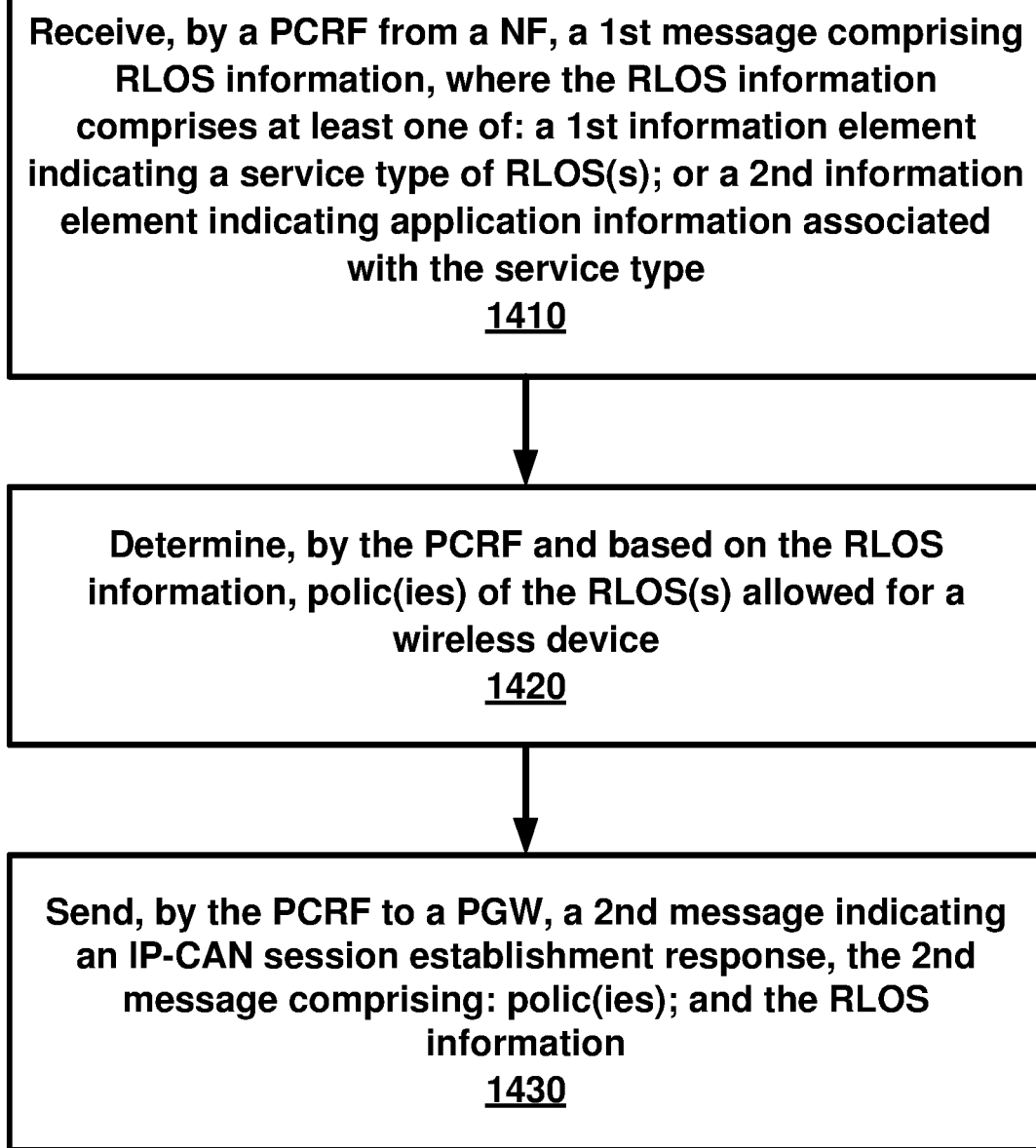
FIG. 14 is an example flow diagram as per an aspect of an embodiment of the present disclosure.

FIG. 14 is an example flow diagram as per an aspect of an embodiment of the present disclosure. At 1410, a policy and charging rules function (PCRF) may receive a first message from a network function (NF). The first message may comprise restricted local operator service (RLOS) information. The RLOS information may comprise a first information element indicating a service type of at least one RLOS. The RLOS information may comprise a second information element indicating application information associated with the service type. At 1420, the PCRF may determine, based on the RLOS information, one or more policies of the at least one RLOS allowed for a wireless device. At 1430, the PCRF may send a second message to a packet data network gateway (PGW). The second message may indicate an internet protocol connectivity access network (IP-CAN) session establishment response. The second message may comprise the one or more policies. The second message may comprise the RLOS information.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {call1, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some Examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
receiving, by a wireless device from a base station, a system information block (SIB) indicating that restricted local operator services (RLOS) are supported by a public land mobile network;
transmitting, based on the SIB indicating the support for the RLOS, a preamble;
receiving a random access response to the preamble;
transmitting, based on the random access response, at least one first radio resource control (RRC) message comprising:
a first information element indicating, to the base station, that an RRC connection of the wireless device is for the RLOS; and
a second information element comprising an attach request message indicating, to a mobility management entity (MME) configured with an RLOS access point name, that the attach request of the wireless device is for the RLOS; and
receiving, from the base station, a second RRC message comprising an attach accept message indicating acceptance of the RLOS by the MME.

2. The method of claim 1, wherein the RLOS is provided an operator of the public land mobile network.

3. The method of claim 1, wherein the at least one first RRC message further comprises an identifier of the wireless device.

4. The method of claim 1, wherein the at least one first RRC message further comprises an RRC connection setup complete message.

5. The method of claim 1, wherein the at least one first RRC message comprises an RRC connection setup message.

6. The method of claim 1, wherein the system information block further indicates a level of support for the RLOS.

7. The method of claim 1, wherein the preamble is a random access preamble for initiation of a random access procedure for an RRC connection.

8. The method of claim 1, wherein the attach accept message comprises RLOS information comprising at least one of:
a first information element indicating a service type of at least one RLOS allowed for the wireless device; or
a second information element indicating application information for the service type.

9. The method of claim 8, wherein the application information comprises at least one of:
a service data flow filter;
an application identifier; or
a uniform resource locator (URL).

10. The method of claim 8, further comprising sending, by the wireless device and based on the RLOS information, packets of the at least one RLOS.

11. The method of claim 1, wherein the RLOS comprises an emergency service for the wireless device.

12. The method of claim 1, wherein the RLOS comprises a voice over long term evolution (VOLTE) service for the wireless device.

13. The method of claim 1, further comprising receiving an RRC connection setup message indicating an acceptance of an RRC connection.

14. The method of claim 1, further comprising sending, by the MME to a serving gateway (SGW), a create session request message comprising a parameter indicating a session or a bearer is established for the RLOS.

15. The method of claim 14, further comprising sending, by the SGW to a packet data network gateway (PGW), a create session request message comprising the parameter indicating the session or the bearer is established for the RLOS.

16. The method of claim 15, further comprising sending, by the PGW to a policy and charging rules function (PCRF), an internet protocol connectivity access network (IP-CAN) session establishment request comprising a RLOS indication indicating a request for a policy for the RLOS.

17. The method of claim 16, further comprising determining, by the PCRF and based on the RLOS indication, one or more policies of at least one RLOS, wherein the one or more policies comprise RLOS information.

18. The method of claim 16, further comprising determining, by the PCRF and based on RLOS information received from a network function, one or more policies of at least one RLOS, wherein the one or more policies comprise the RLOS information.

19. A non-transitory computer-readable medium comprising instructions that, when executed by one or more processors, cause the one or more processors to:

receive, by a wireless device from a base station, a system information block (SIB) indicating that restricted local operator services (RLOS) are supported by a public land mobile network;

transmit, based on the SIB indicating the support for the RLOS, a preamble;

receive a random access response to the preamble;

transmit, based on the random access response, at least one first radio resource control (RRC) message comprising:
- a first information element indicating, to the base station, that an RRC connection of the wireless device is for the RLOS; and
- a second information element comprising an attach request message indicating, to a mobility management entity (MME) configured with an RLOS access point name, that the attach request of the wireless device is for the RLOS; and receive, from the base station, a second RRC message comprising an attach accept message indicating acceptance of the RLOS by the MME.

20. A system comprising:

a base station comprising:
  one or more first processors; and
  first memory storing first instructions that, when executed by the one or more first processors, cause the base station to transmit a system information block (SIB) indicating that restricted local operator services (RLOS) are supported by a public land mobile network; and a wireless device comprising:
  one or more second processors; and
  second memory storing second instructions that, when executed by the one or more second processors, cause the wireless device to:
    receive the SIB;
    transmit, based on the SIB indicating the support for the RLOS, a preamble;
    receive a random access response to the preamble;
    transmit, based on the random access response, at least one first radio resource control (RRC) message comprising:
      a first information element indicating, to the base station, that an RRC connection of the wireless device is for the RLOS; and
      a second information element comprising an attach request message indicating, to a mobility management entity (MME) configured with an RLOS access point name, that the attach request of the wireless device is for the RLOS; and
    receive a second RRC message comprising an attach accept message indicating acceptance of the RLOS by the MME.

* * * * *